(12) United States Patent
Ando et al.

(10) Patent No.: US 8,154,803 B2
(45) Date of Patent: Apr. 10, 2012

(54) DIFFRACTIVE OPTICAL ELEMENT WITH IMPROVED LIGHT TRANSMITTANCE

(75) Inventors: Takamasa Ando, Osaka (JP);
Tsuguhiro Korenaga, Osaka (JP);
Masa-aki Suzuki, Osaka (JP); Yuka Okada, Hyogo (JP)

(73) Assignee: Panasonic Corporation, Osaka (JP)

( * ) Notice: Subject to any disclaimer, the term of this patent is extended or adjusted under 35 U.S.C. 154(b) by 725 days.

(21) Appl. No.: 12/295,525

(22) PCT Filed: Apr. 5, 2007

(86) PCT No.: PCT/JP2007/057638
§ 371 (c)(1),
(2), (4) Date: Sep. 30, 2008

(87) PCT Pub. No.: WO2007/119681
PCT Pub. Date: Oct. 25, 2007

(65) Prior Publication Data
US 2009/0180186 A1 Jul. 16, 2009

(30) Foreign Application Priority Data
Apr. 13, 2006 (JP) .................................. 2006-111202

(51) Int. Cl.
*G02B 5/18* (2006.01)
(52) U.S. Cl. ........................................ 359/576; 359/569
(58) Field of Classification Search .................. 359/566, 359/569, 576
See application file for complete search history.

(56) References Cited

U.S. PATENT DOCUMENTS

| | | | |
|---|---|---|---|
| 5,847,877 A | 12/1998 | Imamura et al. | |
| 6,210,858 B1* | 4/2001 | Yasuda et al. | 430/270.1 |
| 6,912,092 B2* | 6/2005 | Ukuda | 359/642 |
| 7,864,427 B2* | 1/2011 | Korenaga et al. | 359/576 |
| 2004/0104379 A1 | 6/2004 | Ukuda | |
| 2005/0024614 A1* | 2/2005 | Bakker | 355/67 |
| 2005/0063282 A1 | 3/2005 | Takada et al. | |
| 2005/0243423 A1* | 11/2005 | Nakai et al. | 359/566 |
| 2006/0002875 A1* | 1/2006 | Winkler et al. | 424/63 |
| 2006/0023611 A1 | 2/2006 | Wachi et al. | |
| 2009/0128912 A1* | 5/2009 | Okada et al. | 359/576 |

FOREIGN PATENT DOCUMENTS

| | | |
|---|---|---|
| JP | 63-97904 | 4/1988 |
| JP | 3-191319 | 8/1991 |
| JP | 9-127321 | 5/1997 |
| JP | 10-268116 | 10/1998 |
| JP | 11-6902 | 1/1999 |
| JP | 11-287904 | 10/1999 |

(Continued)

*Primary Examiner* — Arnel C Lavarias
(74) *Attorney, Agent, or Firm* — Hamre, Schumann, Mueller & Larson, P.C.

(57) ABSTRACT

A diffractive optical element (10) includes a substrate (11), a protective film (13a, 13b), and a diffraction grating (12a, 12b) disposed between the substrate (11) and the protective film (13a, 13b), wherein the diffraction grating (12a, 12b) is formed of a composite material containing a resin and inorganic particles, a volume ratio of the inorganic particles with respect to the composite material is equal to or smaller than 50% by volume, and the diffraction grating (12a, 12b) has a thickness of equal to or smaller than 20 μm. Since the diffractive optical element (10) uses the composite material containing the resin and the inorganic particles as a material for the diffraction grating (12a, 12b), which is relatively difficult to process, the moldability improves compared with the conventional case of using glass, etc.

11 Claims, 11 Drawing Sheets

FOREIGN PATENT DOCUMENTS

| | | |
|---|---|---|
| JP | 2001-235608 | 8/2001 |
| JP | 2001-249208 | 9/2001 |
| JP | 2001-281429 | 10/2001 |
| JP | 2001-305323 | 10/2001 |
| JP | 2005-158217 | 6/2005 |
| WO | 03/013846 | 2/2003 |
| WO | WO 2007026597 A1 * | 3/2007 |
| WO | WO 2007032217 A1 * | 3/2007 |

* cited by examiner

DIFFRACTIVE OPTICAL ELEMENT WITH IMPROVED LIGHT TRANSMITTANCE

TECHNICAL FIELD

The present invention relates to a diffractive optical element and a method for manufacturing the same.

BACKGROUND ART

It has been known widely in the past that a diffractive optical element having diffraction grating rings on its surface (e.g., an aspherical lens) is capable of reducing lens aberrations such as field curvature and chromatic aberration (deviation of an image-formation point depending on wavelength). If the diffractive optical element is a diffraction grating having a cross-section in a blazed form or a fine-step-like form inscribed in a blaze, the diffractive optical element is allowed to have a diffraction efficiency in a specific order of approximately 100% with respect to a single-wavelength light.

Theoretically, a depth of the diffraction grating (blaze thickness) whose diffraction efficiency for a first-order diffracted light (hereinafter, referred to as "first-order diffraction efficiency") with respect to a certain wavelength is 100% is given as Formula 1 below:

$$d = \frac{\lambda}{n(\lambda) - 1} \quad \text{[Formula 1]}$$

where $\lambda$ represents a wavelength, d represents a diffraction grating depth, and $n(\lambda)$ represents a refractive index and is a function of wavelength.

According to Formula 1, the value of d that gives a diffraction efficiency of 100% varies as the wavelength $\lambda$ varies.

A diffractive optical element 110 shown in FIG. 12 is an exemplary conventional diffractive optical element. A substrate 111 is made of a material having a refractive index of $n(\lambda)$, and a blaze-like diffraction grating 112 is formed on a surface of the substrate 111.

FIG. 13 is a graph showing the wavelength-dependent variation of the first-order diffraction efficiency of the diffractive optical element 110 having a diffraction grating depth d of 0.95 µm, in which the substrate 111 is made of a cycloolefin-based resin ("ZEONEX", produced by Zeon Corporation).

The first-order diffraction efficiency is approximately 100% with respect to a wavelength of 500 nm, whereas it is about 75% with respect to wavelengths of 400 nm and 700 nm. Thus, the variation of the diffraction efficiency with wavelength (wavelength dependence) is significant. When this diffractive optical element is applied to a lens used for imaging in a wide wavelength band (e.g., a visible light wavelength range of about 400 nm to 700 nm), unwanted diffracted light is generated, which causes flare or ghost, thereby deteriorating images or degrading MTF (modulation transfer function) properties. Particularly when diffraction gratings are formed on both surfaces of a single lens or multiple surfaces in an optical system, the generation of unwanted diffracted light becomes more significant.

A diffractive optical element 130 shown in FIG. 14 is another exemplary conventional diffractive optical element. An optical material having a refractive index and a refractive index dispersion different from those of a substrate 131 is applied or cemented as a protective film 133 on a surface of the substrate 131 on which a diffraction grating 132 is formed, whereby the generation of unwanted diffracted light can be suppressed. This diffractive optical element is disclosed more specifically in the documents below.

Patent document 1 discloses an example in which the wavelength dependence of the diffraction efficiency is reduced by setting a refractive index of a substrate on which a diffraction grating is formed, and a refractive index of a protective film formed to cover the diffraction grating, to specific conditions. Patent document 2 discloses an example in which the wavelength dependence of the MTF properties is reduced under the same refractive index conditions as those disclosed in the Patent document 1.

Patent document 3 discloses an exemplary case in which the wavelength dependence of the diffraction efficiency is reduced by using materials obtained by combining a resin, glass, etc. satisfying certain refractive index conditions as materials for a substrate and a protective film.

Patent document 4 discloses that a similar effect can be achieved by using an energy curable resin containing a fluorene derivative.

Materials used in the diffractive optical element 130 are classified roughly into resins and glass. Further, refractive index conditions of members of the diffractive optical element 130 are similar to one another basically. Here, in the case where an optical material as the protective film 133 is applied or cemented onto the substrate 131 on which the diffraction grating 132 is formed, a diffraction grating depth d' that gives a first-order diffraction efficiency of 100% is given as Formula 2 shown below:

$$d' = \frac{\lambda}{|n1(\lambda) - n2(\lambda)|} \quad \text{[Formula 2]}$$

where $n1(\lambda)$ represents a refractive index of a material for forming the substrate, $n2(\lambda)$ is a refractive index of a material for forming the protective film, and both of $n1(\lambda)$ and $n2(\lambda)$ are functions of wavelength.

If the value of the right-hand side of Formula 2 becomes constant in a certain wavelength band, this means that there is no wavelength dependence of the diffraction efficiency in the foregoing wavelength band. In order to satisfy this condition and decrease the diffraction grating depth d', an increase in the value of $|n1(\lambda) - n2(\lambda)|$ is desired; that is, it is desired to form the substrate and the protective film with a combination of a material having a high refractive index and a low dispersion and a material having a low refractive index and a high dispersion. With this configuration, the diffraction grating depth d' is made greater than the diffraction grating depth d of Formula 1.

FIG. 15 is a graph showing the wavelength-dependent variation of the first-order diffraction efficiency of the diffractive optical element 130 having a diffraction grating depth d' of 84 µm, in which the substrate 131 is made of a polycarbonate resin ("Iupilon", produced by Mitsubishi Engineering-Plastics Corporation) and the protective film 133 is made of a polystyrene-based resin produced by TOYO STYRENE Co., Ltd. As shown in FIG. 15, although the diffractive optical element 130 can achieve a reduced wavelength dependence of the diffraction efficiency compared with the diffractive optical element 110, the diffraction grating depth d' has to be increased.

Meanwhile, some methods have been proposed as methods for manufacturing these diffractive optical elements. For example, Patent document 5 and Patent document 6 disclose manufacturing methods in which, in order to remove air bubbles that become a cause of unwanted diffracted light, an optical material to be applied is limited to one having a low viscosity, or the material is vibrated after application.

Patent document 1: JP 9 (1997)-127321 A
Patent document 2: JP 3 (1991)-191319 A
Patent document 3: JP 10 (1998)-268116 A
Patent document 4: JP 11 (1999)-287904 A
Patent document 5: JP 2001-249208 A
Patent document 6: JP 2001-235608 A However, the diffractive optical element shown in FIG. 12 has a drawback in that, because of the wavelength dependence of the diffraction efficiency, unwanted diffracted light is generated in a certain wide wavelength band. Further, the diffractive optical element shown in FIG. 14 is capable of reducing the wavelength dependence of the diffraction efficiency and suppressing the generation of unwanted diffracted light, but has the following drawbacks: if glass is used as a material for the diffractive optical element, the molding is difficult, whereas if a resin is used, the diffraction efficiency and the wavelength dependence of the same become easily influenced by temperature variation; and the diffraction grating depth has to be increased since the materials are limited. As the diffraction grating depth is increased, there is an increased possibility that the processing of a mold for producing the diffraction grating would become difficult. Moreover, materials other than glass and resins have difficulty in maintaining transparency.

DISCLOSURE OF INVENTION

The present invention provides a diffractive optical element that can maintain transparency and be molded easily, and a method for manufacturing the same.

A diffractive optical element according to the present invention includes a substrate, a protective film, and a diffraction grating disposed between the substrate and the protective film, wherein the diffraction grating is formed of a composite material containing a resin and inorganic particles, a volume ratio of the inorganic particles with respect to the composite material is equal to or smaller than 50% by volume, and the diffraction grating has a thickness of equal to or smaller than 20 μm.

A first method for manufacturing a diffractive optical element according to the present invention is a method for manufacturing a diffractive optical element including a substrate, a protective film, and a diffraction grating disposed between the substrate and the protective film. The method includes forming the substrate, disposing a composite material containing an uncured curable resin and inorganic particles on a surface of the substrate and then curing the curable resin, thereby forming the diffraction grating, and forming the protective film so as to cover a surface of the diffraction grating opposite to the substrate, wherein a volume ratio of the inorganic particles with respect to the composite material in the diffraction grating is equal to or smaller than 50% by volume, and the diffraction grating has a thickness of equal to or smaller than 20 μm.

A second method for manufacturing a diffractive optical element according to the present invention is a method for manufacturing a diffractive optical element including a substrate, a protective film, and a diffraction grating disposed between the substrate and the protective film. The method includes forming the substrate, disposing a composite material containing a thermoplastic resin whose viscosity has been reduced and inorganic particles on a surface of the substrate and then cooling to solidify the thermoplastic resin, thereby forming the diffraction grating, and forming the protective film so as to cover a surface of the diffraction grating opposite to the substrate, wherein a volume ratio of the inorganic particles with respect to the composite material in the diffraction grating is equal to or smaller than 50% by volume, and the diffraction grating has a thickness of equal to or smaller than 20 μm.

DESCRIPTION OF THE INVENTION

Figure 1:
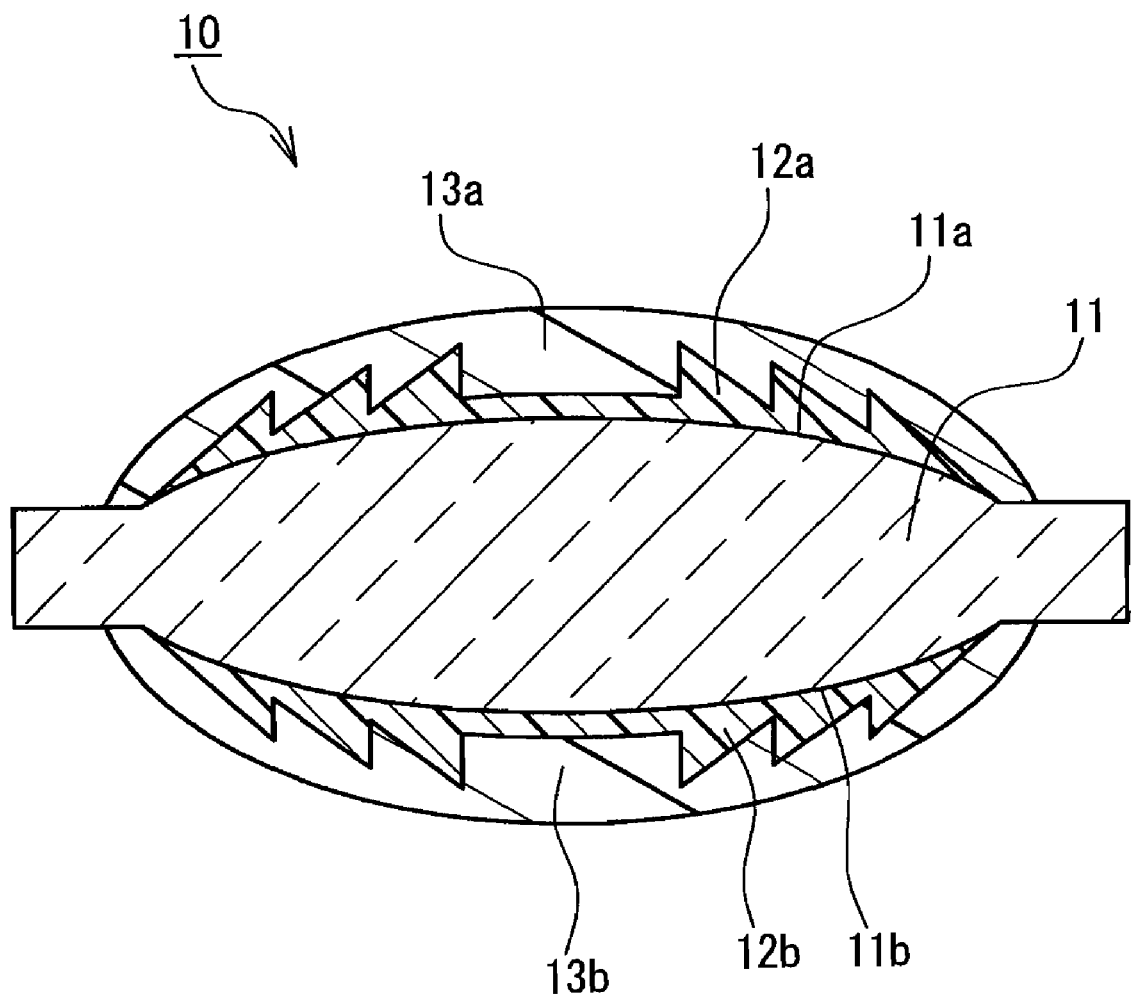
FIG. 1 is a sectional view showing a diffractive optical element according to Embodiment 1 of the present invention.

A diffractive optical element according to the present invention includes a substrate, a protective film, and a diffraction grating disposed between the substrate and the protective film. Then, the diffraction grating is formed of a composite material containing a resin and inorganic particles. Also, the volume ratio of the inorganic particles with respect to the composite material is equal to or smaller than 50% by volume, and the diffraction grating has a thickness of equal to or smaller than 20 μm.

Since the diffractive optical element according to the present invention uses the above-noted composite material as a material for a diffraction grating, which is relatively difficult to process, the moldability is improved compared with the conventional case of using glass, etc. Also, the resin and the inorganic particles to be used as the material for the diffraction grating can be selected suitably so that the difference in refractive index between the protective film and the diffraction grating becomes optimal. This permits a wider range of selection of the material compared with the conventional case of using a resin, etc., so that the depth of the diffraction grating can be reduced, for example. Consequently, the processing becomes easier. Further, the volume ratio of the above-noted inorganic particles with respect to the above-noted composite material is equal to or smaller than 50% by volume, and the diffraction grating has a thickness of equal to or smaller than 20 μm. Therefore, the transparency of the diffraction grating can be maintained. Incidentally, even when the above-noted composite material is used as the material for the diffraction grating, the transparency of the entire diffractive optical element can be maintained by using a highly transparent material (for example, glass, a resin or the like) as the materials for the protective film and the substrate. Accordingly, it is possible to provide a diffractive optical element that can be processed easily without deteriorating the diffraction efficiency, for example.

In order to maintain a high diffraction efficiency over the entire visible region, Formula 2 described above has to be satisfied in the entire visible region, so that the combination of the materials for the diffraction grating and the protective film is limited to a certain range. However, by forming a diffraction grating portion as a member different from a substrate portion as in the configuration of the present invention, the range of selection of the material for the substrate, which accounts for a major portion of the lens, is expanded. For example, when glass is used as the material for the substrate, the heat resistance improves and the variation of optical properties with temperature variation decreases compared with the usual case of using a resin. Further, a general-purpose resin may be used as the material for the substrate, and it becomes possible to use a material with a small wavelength dispersion of the refractive index and a material with a high light resistance, for example.

In order to improve the transparency further in the diffractive optical element according to the present invention, the volume ratio of the inorganic particles with respect to the composite material preferably is equal to or smaller than 40% by volume and more preferably is equal to or smaller than 30% by volume. Also, in order to reduce the depth of the diffraction grating so as to improve the processing accuracy of the mold in the diffractive optical element according to the present invention, the volume ratio of the inorganic particles with respect to the composite material preferably is equal to or larger than 5% by volume and more preferably is equal to or larger than 10% by volume.

Further, in order to improve the transparency further in the diffractive optical element according to the present invention, it is preferable to minimize the thickness of the diffraction grating. It should be noted that "the thickness of the diffraction grating" refers to a minimum distance from a top of a blaze to the substrate.

The diffractive optical element according to the present invention is, for example, a lens, a spatial low-pass filter, a polarization hologram or the like, and can be applied widely to optical devices in which a general diffraction grating is used.

The above-noted substrate is not particularly limited as long as it is used generally in a diffractive optical element. As to the shape of the substrate, it is preferable that at least one surface of the substrate is aspherical, and it is more preferable that both surfaces thereof are aspherical. However, both of the surfaces do not have to have the same curvature, and they do not have to be convex. For example, they may be a concave surface and a convex surface, may be both concave surfaces, may be both flat surfaces, may be a flat surface and a convex surface, may be a flat surface and a concave surface, or the like. It should be noted that the "aspherical" surface mentioned above refers to a curved surface satisfying Formula 3 below.

$$z = \frac{c(x^2 - y^2)^2}{1 + \sqrt{1 - (K+1)c^2(x^2 - y^2)^4}} + A(x^2 - y^2)^4 + B(x^2 - y^2)^6 + C(x^2 - y^2)^8 + D(x^2 - y^2)^{10}$$ [Formula 3]

The above formula expresses an aspherical surface when rotated around a z axis that is perpendicular to an x-y plane, c represents a central curvature, and
A, B, C and D are coefficients representing the deviation from a quadric surface.

Further, depending on the value of K, the following aspherical surfaces are formed.
When 0>K, an ellipsoid whose minor axis is the optical axis is formed;
when −1<K<0, an ellipsoid whose major axis is the optical axis is formed;
when K=−1, a paraboloid is formed; and
when K<−1, a hyperboloid is formed.

The above-noted protective film is not particularly limited in terms of its thickness, material, etc. as long as it is used generally in a diffractive optical element, but preferably is formed of a composite material containing a resin and inorganic particles. The reason is that, because the range of selection of the material is expanded at the time of setting the difference in refractive index between the protective film and the diffraction grating to be optimal, the depth of the diffraction grating can be reduced, for example.

The above-noted diffraction grating is not particularly limited in terms of its shape, etc. as long as it is used generally in a diffractive optical element and disposed between the substrate and the protective film. The diffraction grating does not have to have the same shape as the substrate covered thereby. Both of the surfaces may be convex surfaces, concave surfaces or flat surfaces, or they may be a concave surface and a convex surface, may be a flat surface and a convex surface or may be a flat surface and a concave surface. For example, a ring form diffraction grating, a straight-line diffraction grating, a curved-line diffraction grating or a holographic diffraction grating may be used. Among them, a ring form diffraction grating is preferable. The reason is that the ring form diffraction grating has excellent aberration properties because of its rotational symmetry with respect to an axis passing through a surface center.

The above-noted composite material forming the diffraction grating has an intermediate physical property between the resin and the inorganic particles in terms of a coefficient of thermal expansion and a temperature dependence of a refractive index. Accordingly, the temperature dependence of the optical performance, which often poses a problem in a diffractive optical element formed of a resin, is reduced, and thus the composite material is considerably superior to the resin in terms of reliability and optical stability.

Also, the composite material may contain a material other than the resin and the inorganic particles. For example, a dispersing agent or a curing agent may be contained. The content of the material other than the resin and the inorganic particles usually is less than 10% by volume and, for example, less than 1% by volume.

The above-noted inorganic particles refer to an inorganic compound formed in a particle form and is not particularly limited in terms of their material and particle diameter.

In the diffractive optical element according to the present invention, by selecting the volume ratio of the inorganic particles, it is possible to control the refractive index and the Abbe's number of the composite material freely. For example, the refractive index of the composite material can be estimated from Formula 4 below according to the Maxwell-Garnett theory:

$$n_{av}^2 = \frac{n_m^2\{n_p^2 + 2n_m + 2p(n_p^2 - n_m^2)\}}{n_p^2 + 2n_m - p(n_p^2 - n_m^2)}$$ [Formula 4]

where a refractive index $n_{av}$ represents an average refractive index of the composite material, $n_p$ represents a refractive index of the inorganic particles, nm represents a refractive index of a resin, and P represents a volume ratio of the inorganic particles with respect to the composite material. In the case where the inorganic particles absorb light or are made of a metal, a complex refractive index is calculated as the refractive index thereof.

Incidentally, the actual refractive index of the composite material can be determined by measurement using, for example, the ellipsometry method, the Abeles method, the optical waveguide method, the spectral reflectance method, etc., after molding.

The above-noted inorganic particles have an average particle diameter preferably ranging from 1 nm to 100 nm and more preferably ranging from 1 nm to 40 nm. It should be noted that the "average particle diameter ranging from 1 nm to 100 nm" corresponds to the case in which the inorganic particles are observed by imaging with TEM (transmission electron microscope), the major axes of 200 particles in the imaging screen are measured, and the average thereof ranges from 1 nm to 100 nm. When the particle diameter of the inorganic particles is sufficiently shorter than a wavelength of light, the dispersion thereof is excellent, so that the composite material can be considered as a homogeneous medium with no variation in refractive index. Incidentally, if the average particle diameter of the inorganic particles is ¼ or larger of the wavelength of light, for example, exceeds 100 nm, the scattering of inorganic particles in the composite material becomes Mie scattering, which impairs the transparency. In the case of a substance that exhibits a quantal effect, the average particle diameter of the inorganic particles of less than 1 nm sometimes affects an optical performance of the substance, for example, causes emission of fluorescence. Accordingly, when the particle diameter of the inorganic particles ranges from 1 nm to 100 nm, only the Rayleigh scattering occurs, and excellent dispersion is achieved in the composite material, whereby the composite material achieves high transparency. Besides, no additional optical characteristic such as fluorescence is exhibited.

As the inorganic particles, it is possible to use metal oxides such as titanium oxide, tantalum oxide, zinc oxide, zirconium oxide, aluminum oxide, yttrium oxide, silicon oxide, niobium oxide, cerium oxide, indium oxide, tin oxide and hafnium oxide. The inorganic particles may be formed of one of the foregoing oxides, or may be formed of a composite oxide of some of these oxides. Further, as a material for the inorganic particles, a metal nitride such as silicon nitride, a metal carbonate such as silicon carbonate, or light-transmitting carbon-based material such as diamond or diamond-like carbon may be used. Further, a sulfide such as sulfur sulfide or tin sulfide, a metal such as gold, platinum, silver, palladium, copper or aluminum, or a semiconductor material such as silicon or germanium may be used. In particular, zirconium oxide, zinc oxide or aluminum oxide can be used in a preferred manner. This is because the wavelength dependence of the diffraction efficiency in the diffractive optical element according to the present invention can be reduced further. In general, the diffraction efficiency of the diffractive optical element varies depending on a wavelength to which it is exposed, and for example, the diffraction efficiency tends to decrease in the vicinity of a wavelength of 400 nm or in the vicinity of a wavelength of 700 nm.

As the above-noted resin, those having an excellent light transmitting property can be used, among resins such as thermoplastic resins, thermosetting resins and photocurable resins. It may be possible to use acrylic resins (for example, methyl polymethacrylate, etc.), epoxy resins, polyester resins (for example, polyethylene terephthalate, polybutylene terephthalate, polycaprolactone, etc.), polystyrene resins (for example, polystyrene, etc.), polyolefin resins (for example, polypropylene, etc.), polyamide resins, polyimide resins (for example, polyimide, polyether imide, etc.), polyvinyl alcohol resins, butyral resins, fluorene-based resins, vinyl acetate resins, etc. Further, engineering plastics such as polycarbonate, liquid crystal polymers, polyphenylene ether, polysulfone, polyether sulfone, polyarylate and amorphous polyolefin also may be used. Still further, mixtures and copolymers of these resins and polymers are usable. Furthermore, products obtained by modifying these resins may be used. In particular, acrylic resins, epoxy resins, amorphous polyolefin resins, polycarbonate resins, polyimide resins and butyral resins have high transparency and excellent moldability.

Materials forming the diffractive optical element according to the present invention are not particularly limited as long as they have a light transmitting property except for the composite material. For example, they are a resin or glass. When a member using the glass material and a member using the resin material are in contact with each other, it is preferable that the difference in coefficient of thermal expansion between the two materials is small in order to reduce a stress at their interface due to temperature variation or the like.

From the viewpoint of moldability, it is preferable that the substrate contains a resin. Also, the substrate containing an optical glass may be used. The reason is that the optical glass has an advantage of not causing thermal expansion or thermal contraction easily. It is particularly preferable that the diffraction grating and the protective film are formed of a material containing a resin and the substrate is formed of an optical glass, because it is possible both to improve the moldability and to reduce the temperature dependence of the refractive index.

It is preferable that the composite material is an infrared radiation-blocking material. This eliminates the need to use an infrared radiation cutoff filter separately at the time of use in combination with an imaging device or a sensor requiring the blocking of infrared radiation such as a CCD (charge coupled device) or a CMOS (complementary metal-oxide semiconductor). The infrared radiation-blocking material is, for example, a material containing a substance that absorbs light having a wavelength in an infrared radiation range. As the substance that absorbs light having a wavelength in the infrared radiation range, it is appropriate to use, for example, a resin in which a complex salt of a metal ion such as a copper ion is mixed, a resin in which a dye such as a cyanine dye that has an absorption in a near-infrared radiation wavelength range is dissolved, or inorganic particles made of indium tin oxide (ITO) or the like.

It is more preferable that all the members constituting the diffractive optical element according to the present invention have a high transparency. However, when the diffraction grating has a low transparency, for example, it is possible to suppress the reduction of the light transmittance of the entire diffractive optical element by raising the transparency of the other members and reducing the thickness of the diffraction grating. Here, "having a low transparency" means that, when light is transmitted through the member, the light transmittance for light passing through the center of the diffractive optical element and entering at an angle of view of 0° is less than 90%.

In the present invention, the thickness of a portion under the blaze in the diffraction grating portion may be set freely, and it is preferable that the transmittance of the diffraction grating portion including the thickness of the portion under the blaze is in the range of at least 90% over the entire visible region. Here, the thickness of the portion under the blaze refers to a minimum distance from a base of the step of the diffraction grating to the substrate. By adjusting the thickness of the portion under the blaze, the diffraction grating can be made thinner, so that the light transmittance can be improved. On the other hand, considering the ease of processing, it is preferable that the thickness of the portion under the blaze is about 2 μm to about 5 μm. In the present description, the diffraction grating portion including the portion under the blaze is referred to as a "diffraction grating."

Further, the diffractive optical element according to the present invention further may include an antireflection film that is disposed on a surface of the protective film opposite to the diffraction grating. It is preferable that this antireflection film is formed of a material having a lower refractive index than the protective film. The antireflection film is provided further, thereby reducing light to be totally reflected among light that has entered the diffractive optical element, making it possible to raise the light transmittance. Here, the "surface of the protective film opposite to the diffraction grating" refers to a front surface when a side of the protective film opposite to the diffraction grating is viewed in a plan view, and may be a horizontal surface or a curved surface.

It is preferable that the antireflection film is formed of a composite material comprising a resin and inorganic particles. This is because an excellent moldability can be achieved, and the range of selection of the material is expanded at the time of setting the difference in refractive index between the antireflection film and the protective film to be optimal. Also, it is more preferable that the inorganic particles are silicon oxide. The reason is that, since silicon oxide has an excellent light transmitting property and is characterized by a low refractive index and a high Abbe's number as an inorganic material, an antireflection effect can be achieved over a wide wavelength band.

A first method for manufacturing a diffractive optical element according to the present invention includes forming the substrate, disposing a composite material containing an uncured curable resin and inorganic particles on a surface of the substrate and then curing the curable resin, thereby forming the diffraction grating, and forming the protective film so as to cover a surface of the diffraction grating opposite to the substrate. A volume ratio of the inorganic particles with respect to the composite material in the diffraction grating is equal to or smaller than 50% by volume, and the diffraction grating has a thickness of equal to or smaller than 20 μm. This method makes it possible to manufacture the diffractive optical element according to the present invention practically.

The above-noted curable resin is not particularly limited and can be any conventional photocurable resins or thermosetting resins, but it is preferable to use photocurable resins. This is because it is possible to prevent thermal deformation of the substrate at the time of forming the diffraction grating and thermal deformation of the substrate and the diffraction grating at the time of forming the protective film.

A second method for manufacturing a diffractive optical element according to the present invention includes forming the substrate, disposing a composite material containing a thermoplastic resin whose viscosity has been reduced and inorganic particles on a surface of the substrate and then cooling to solidify the thermoplastic resin, thereby forming the diffraction grating, and forming the protective film so as to cover a surface of the diffraction grating opposite to the substrate. A volume ratio of the inorganic particles with respect to the composite material in the diffraction grating is equal to or smaller than 50% by volume, and the diffraction grating has a thickness of equal to or smaller than 20 μm. This method also makes it possible to manufacture the diffractive optical element according to the present invention practically.

Additionally, when disposing the composite material in the first and second manufacturing methods described above, it is preferable that the composite material that has been filled in a recessed portion copying the diffraction grating is brought into close contact with the surface of the substrate under a reduced pressure. This is because air bubbles can be prevented from remaining between the substrate and the diffraction grating.

How to prepare the composite material is not particularly limited and can be a physical method or a chemical method. For example, the composite material can be produced by any of the methods (1) to (5) below:

(1) the method of mixing an uncured resin or a resin that has been heated to have a low viscosity and inorganic particles (for example, inorganic particles with a primary particle diameter of less than 1 μm) mechanically/physically. Examples of mixing them mechanically/physically can include a method of mixing them using a stirring apparatus, that using a mixing apparatus and the like.

(2) the method of mixing a solution obtained by diluting a resin with a solvent and inorganic particles (for example, inorganic particles with a primary particle diameter of less than 1 μm) mechanically/physically similarly to the method (1).

(3) the method of obtaining a mixture by mixing a raw material for a resin (for example, a monomer, an oligomer, a low-molecular-weight polymer, etc.) and inorganic particles (for example, inorganic particles with a primary particle diameter of less than 1 μm) mechanically/physically similarly to the method (1), followed by polymerization of the raw material for the resin.

(4) the method of mixing a resin or a solution in which a resin is dissolved and a raw material for inorganic particles, and then allowing the raw material for the inorganic particles to react by, for example, a sol-gel method so as to synthesize the inorganic particles in the resin.

(5) the method of mixing a raw material for a resin (for example, a monomer, an oligomer, a low-molecular-weight polymer, etc.) and a raw material for inorganic particles and then carrying out a process of allowing the raw material for the inorganic particles to react so as to synthesize the inorganic particles and a process of polymerizing the raw material for the resin so as to synthesize the resin.

In the method (2) described above, the solvent may be removed after or before applying the composite material on the substrate. Also, the polymerization in the method (3) described above may be carried out after or before applying the mixture to the lens.

The methods (1), (2) and (3) described above have an advantage in that various inorganic particles that have been formed in advance can be used, thus making it possible to prepare the composite material using a general-purpose dispersing apparatus. Further, since the methods (4) and (5) require chemical reaction, there is a restriction in materials. However, these methods have an advantage in that the raw materials can be mixed at the molecular level, thus raising the dispersion of the inorganic particles.

In the methods described above, the order of mixing the inorganic particles or the raw material for the inorganic particles and the resin or the raw material for the resin is not particularly limited but may be any preferable order selected suitably. For example, it may be possible to add the resin, the raw material for the resin or the solution in which either of them is dissolved to the solution in which the inorganic particles whose primary particle diameter substantially ranges from 1 nm to 100 nm are dispersed, and mix them mechanically/physically.

The following is a description of embodiments of the present invention, with reference to the accompanying drawings. The same portions will be assigned the same reference signs, and the redundant description thereof will be omitted in some cases.

(Embodiment 1)

FIG. 1 is a sectional view showing a lens serving as an example of a diffractive optical element according to the present invention. A lens 10 of the present embodiment includes a substrate 11, a diffraction grating 12a formed on one surface 11a of the substrate 11, a protective film 13a covering the diffraction grating 12a, a diffraction grating 12b formed on one surface 11b, which is the opposite surface of the one surface 11a, of the substrate 11 and a protective film 13b covering the diffraction grating 12b. The diffraction gratings 12a and 12b are formed of a composite material containing a resin and inorganic particles. Further, the volume ratio of the inorganic particles with respect to the composite material is equal to or smaller than 50% by volume, and the diffraction gratings (12a and 12b) have a thickness of equal to or smaller than 20 μm. Then, both of the surfaces 11a and 11b of the substrate 11 have an aspherical shape. Surfaces of the diffraction gratings 12a and 12b on the side of the protective films 13a and 13b are provided with a ring-form blaze. Since the lens 10 uses the above-noted composite material as a material for the diffraction gratings 12a and 12b, which can be relatively difficult to process, the moldability improves compared with the conventional case of using glass, etc. Incidentally, even when the above-noted composite material is used as the material for the diffraction gratings 12a and 12b, the transparency of the lens 10 can be maintained by using a highly transparent material (for example, glass, a resin or the like) as the materials for the protective films 13a and 13b and the substrate 11.

Figure 2A:
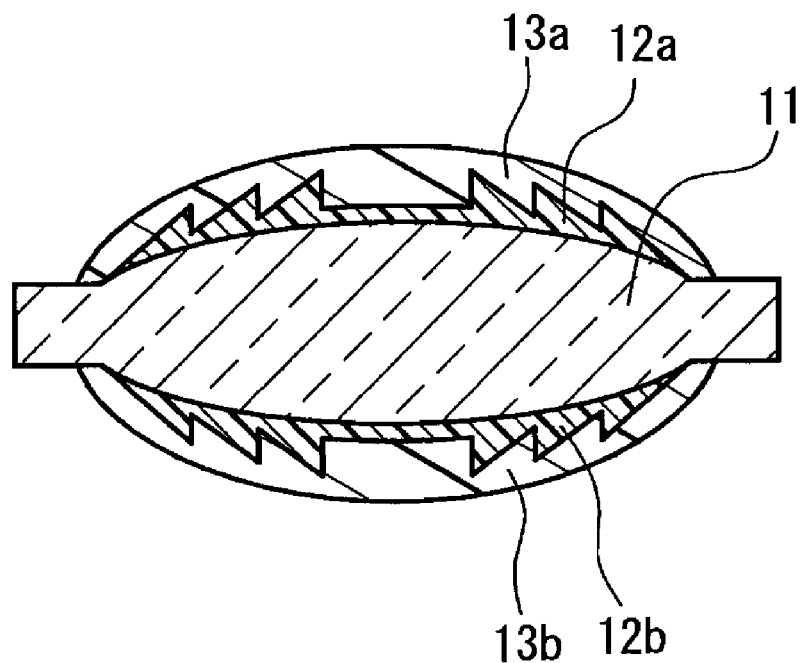
FIGS. 2A and 2B are sectional views showing variations of the diffractive optical element according to Embodiment 1 of the present invention.
Figure 2B:
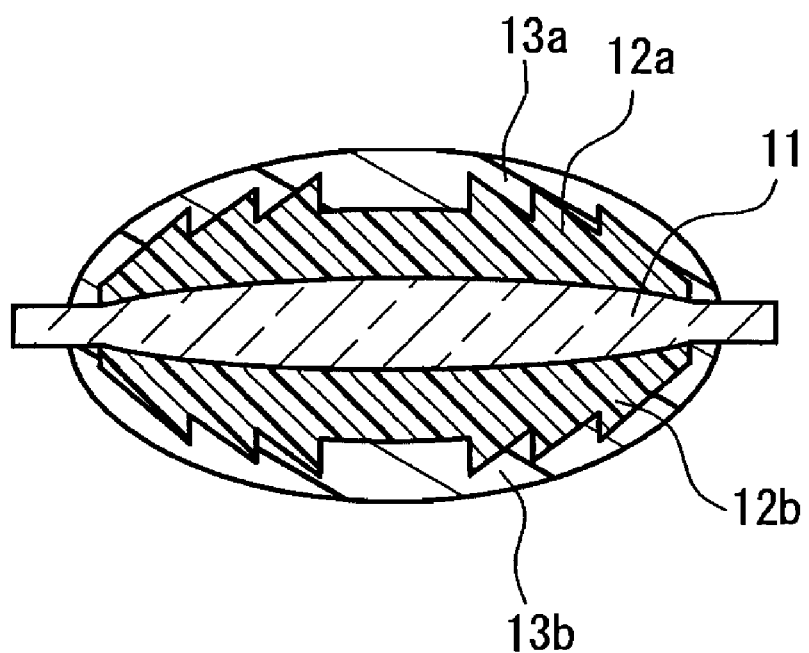

In the lens of the present embodiment, as illustrated in a sectional view of the lens in FIG. 2A, the diffraction gratings 12a and 12b can be made to be sufficiently thinner than the substrate 11. When the diffraction gratings 12a and 12b are thin, even if a composite material with a low transparency is used as the material for the diffraction gratings 12a and 12b, the entire lens can achieve a practically sufficient light transmittance as long as a highly transparent material is used as the material for the substrate 11. Alternatively, as shown in FIG. 2B, the diffraction gratings 12a and 12b can be made to be thicker than the substrate 11. At this time, even if a material with a low transparency is used as the material for the substrate 11, the entire lens can achieve a practically sufficient light transmittance as long as a highly transparent material is used as the composite material forming the diffraction gratings 12a and 12b.

The following is a description of a preferred example of a combination of the materials forming individual members of the lens 10 (hereinafter, referred to as "Specific example 1").

SPECIFIC EXAMPLE 1

The substrate 11 is formed of a resin (with a d-line refractive index of 1.585) containing polycarbonate as a principal component. It is appropriate that this substrate 11 should be formed by injection molding using a mold, press forming or the like.

The diffraction gratings 12a and 12b are formed of a composite material (with a d-line refractive index of 1.679, an Abbe's number of 19.2 and a content of zinc oxide in the composite material of 43% by volume) containing zinc oxide and a resin containing an epoxy resin as a principal component. These diffraction gratings 12a and 12b have a depth of 5.5 μm.

The protective films 13a and 13b are formed of a composite material (with a d-line refractive index of 1.786, an Abbe's number of 41.5 and a content of zirconium oxide in the composite material of 50% by volume) containing zirconium oxide and a resin containing an epoxy resin as a principal component. These protective films 13a and 13b can be formed by application by spin coating, dip coating or the like, or formed by molding using a mold.

The above-mentioned "resin containing an epoxy resin as a principal component" refers to a resin containing at least 90% by weight, and preferably at least 95% by weight, of an epoxy resin. Also, the "resin containing an epoxy resin as a principal component" may be a photocurable resin, a thermosetting resin or an air-setting resin that cures by itself. With the photocurable resin and the air-setting resin, it is possible to form the protective film on the diffraction grating easily by employing application methods such as screen printing and pad printing. Such printing methods are suitable for mass production because of their shorter time required to produce one product compared with the forming methods using a mold and the like. After forming the protective film, it is appropriate to allow ultraviolet curing or air setting. Incidentally, the resin containing an epoxy resin as a principal component may be replaced by, for example, an acrylate resin or the like.

Although the refractive indices of the substrate 11, the diffraction gratings 12a and 12b and the protective films 13a and 13b are not particularly limited, it is preferable that the refractive indices of the diffraction gratings 12a and 12b are close to the refractive index of the substrate 11 (for example, −5% to 5% of the refractive index of the substrate). This is because it is possible to reduce reflection loss at an interface between the substrate 11 and the diffraction grating 12a or the diffraction grating 12b.

It is preferable that the composite material forming at least one selected from the diffraction gratings 12a and 12b and the protective films 13a and 13b further contains a substance that absorbs light having a wavelength in an infrared radiation range. With this structure, it is possible to provide a lens having an infrared radiation-blocking effect. As the substance that absorbs light having a wavelength in an infrared radiation range, a resin absorbing wavelengths in the infrared radiation range may be used. For example, it may be possible to use a resin in which a complex salt of a metal ion such as a copper ion is mixed or a resin in which a dye such as a cyanine dye that has an absorption band in a near-infrared radiation wavelength range is mixed. Alternatively, inorganic particles made of indium tin oxide (ITO) or the like may be used.

At least one selected from the protective films 13a and 13b preferably is configured so that a surface thereof opposite to the side of the diffraction grating is in an antireflection form having nano-order asperities. This is because the reflection of light can be reduced further. This surface form can be obtained easily by, for example, a transfer method using mold (nanoimprinting) or the like.

Since the diffraction gratings 12a and 12b and the protective films 13a and 13b are formed of the composite material containing a resin, the lens 10 in Specific example 1 is manufactured more easily than the lens formed of glass or the like. Also, such a lens can be mass-produced easily by molding using a mold. As one exemplary method of processing the molds with the diffraction grating pattern, it is possible to adopt a method of forming plating films on surfaces of mold materials, and subjecting the plating film to processing by diamond-tool turning so that recessed portions copying the diffraction grating patterns are formed. In the case where, for example, a photocurable resin is mixed in the composite material, the lens provided with the diffraction grating formed of the composite material can be produced easily by a method in which the photocurable resin is cured by irradiation of ultraviolet radiation or visible light and is released, which is a so-called photopolymer molding. A mold used in this method may be formed by forming step-like patterns (inverted patterns of the diffraction grating) on a material that transmits ultraviolet radiation or visible light, such as quartz, by dry etching or the like.

In contrast, a conventional lens disclosed in the above-described Patent document 1 or 2 is difficult to manufacture, since glass is used therein as a constituent material of the diffraction grating or the protective film. In a lens formed by using a glass member and a resin member in combination, it is difficult to form the diffraction grating with a resin while forming the protective film with glass, for example. The reason is that, if a glass film with a thickness of more than several micrometers is formed on the resin, either the diffraction grating or the protective film cracks. Besides, with regard to productivity, the diffraction grating formed of glass is significantly inferior to the diffraction grating formed of a resin. Press forming using a mold is the most promising method in terms of productivity, but the durability of the mold (for example, the number of usable times) is only ¹⁄₁₀ to ¹⁄₁₀₀ as compared with the durability of a mold in the resin-used molding, and hence, this is significantly disadvantageous from the viewpoints of economy and mass production, as compared with resins.

Further, the conventional lens disclosed in the Patent document 3 described above combines polycarbonate and polystyrene so that the wavelength dependence of the diffraction efficiency is eliminated. However, this requires a diffraction grating depth of about 280 μm. It is difficult to perform mold processing with high processing accuracy for a diffraction grating with a depth of more than several tens of micrometers. This is because, as the mold processing is performed generally using a bite, a greater diffraction grating depth increases an amount of processing, so that a bite tip is worn out, which degrades the processing accuracy. At the same time, when a diffraction grating depth is great, the grating pitches cannot be narrowed. This is because, an increased diffraction grating depth necessitates the mold processing using a bite whose tip has a greater radius of curvature, and as a result, the processing of a diffraction grating cannot be performed unless each pitch of diffraction gratings is widened to some extent. This reduces the degree of freedom in the designing of diffraction grating patterns as the diffraction grating depth increases, so that the aberration reducing effect achieved by the diffraction grating is almost canceled. Still further, since the difference in the refractive index between polycarbonate and polystyrene varies with the ambient temperature variation, the wavelength dependence of the diffraction efficiency tends to occur, along with the ambient temperature variation. It should be noted that the diffraction grating depth of equal to or smaller than 20 μm is desired in order to achieve the ease of the mold processing, the contribution of the diffraction grating to lens performances and the stability with respect to the ambient temperature.

Figure 3:
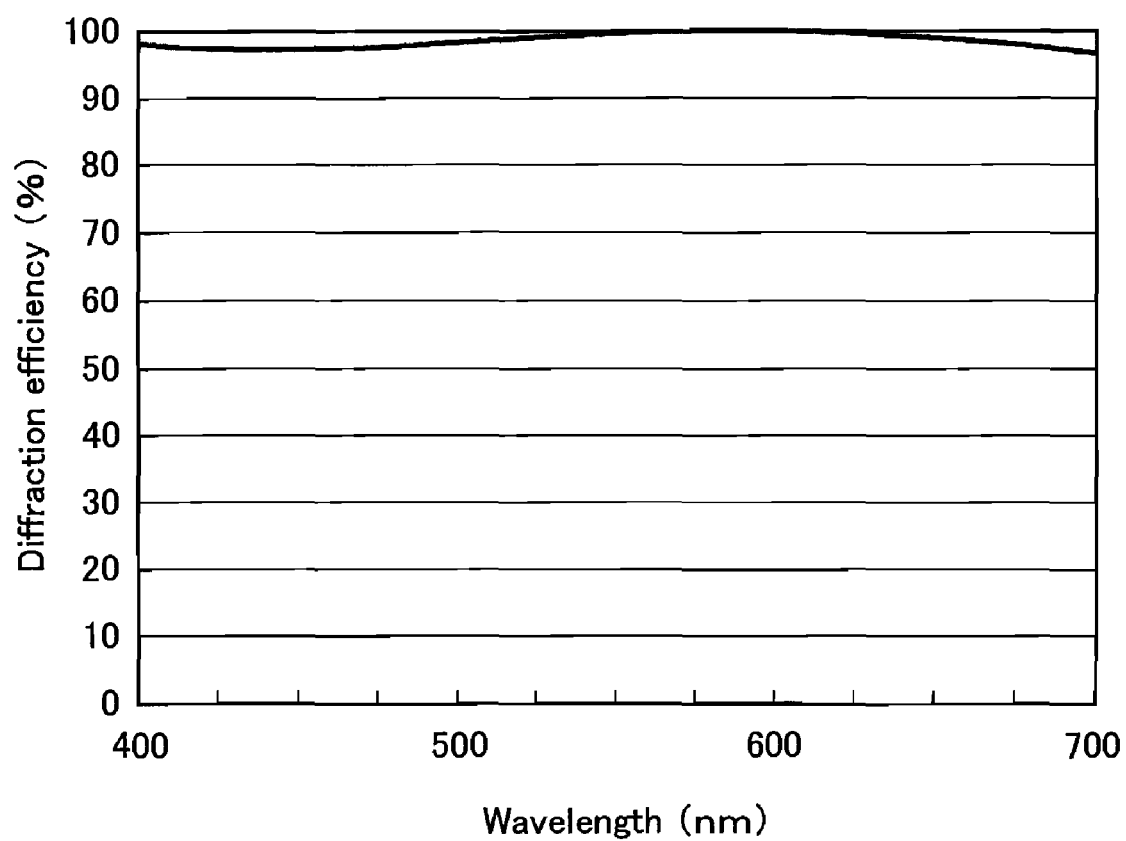
FIG. 3 is a graph showing variation of the first-order diffraction efficiency with wavelength that a diffractive optical element according to a specific example in Embodiment 1 of the present invention exhibited.

FIG. 3 is a graph showing variation of the first-order diffraction efficiency with wavelength in one surface of the lens in Specific example 1. From FIG. 3, it is evident that the diffraction efficiency is equal to or higher than 95% over the entire region of visible light at wavelengths of 400 nm to 700 nm.

It should be noted that the same properties as those shown in FIG. 3 can be achieved when a similar lens is formed by interchanging the material forming the diffraction grating and the material forming the protective film used for the lens in Specific example 1.

Now, a preferred method for manufacturing the lens in Specific example 1 described above will be described. FIGS.

4 and 5 are sectional views respectively showing processes of the method for manufacturing the lens in Specific example 1.

Figure 4D:
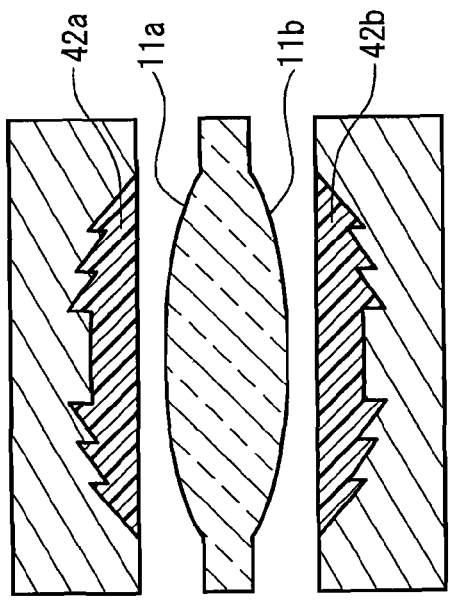
FIGS. 4A to 4E are sectional views respectively showing processes of a method for manufacturing the diffractive optical element according to Embodiment 1 of the present invention.
Figure 4E:
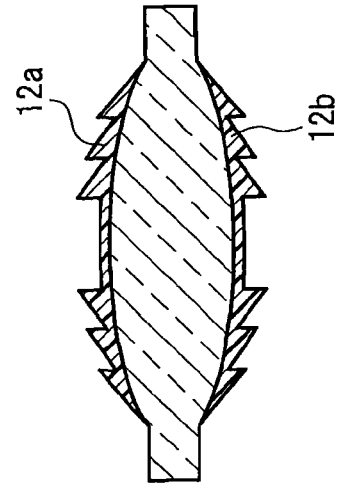
Figure 4A:

First, as shown in FIG. 4A, the substrate 11 is formed. Here, in order to reduce the reflection loss at the interface between the substrate 11 and the diffraction gratings 12a and 12b, it is desired that the refractive index of the substrate 11 should be close to the refractive indices of the diffraction gratings 12a and 12b. There is no particular limitation on the method for forming an aspherical shape. For example, it is appropriate to employ a molding process using a mold. In the case where a photocurable material is contained as a principal component, photopolymer molding or the like may be used.

Figure 4B:
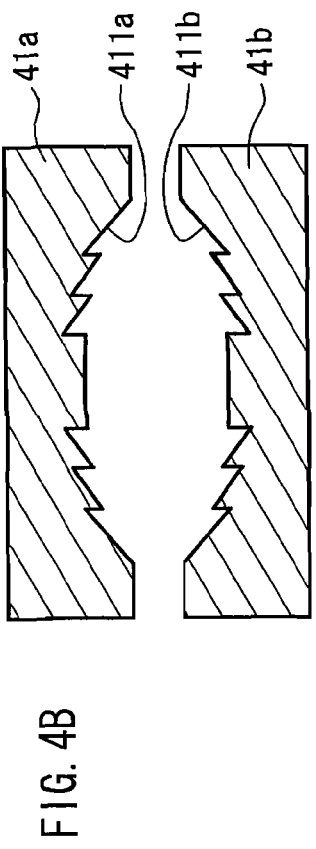
Figure 4C:
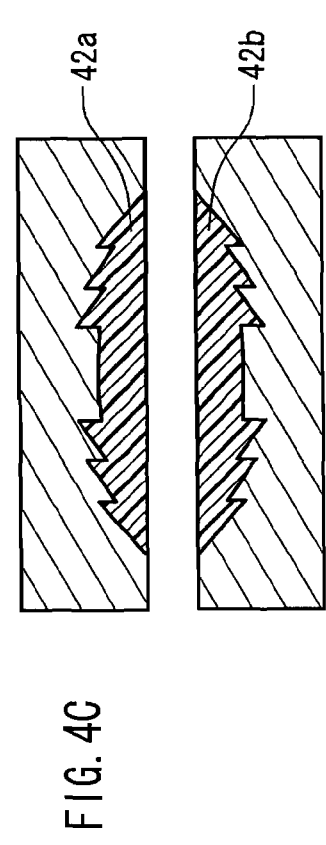

Next, as shown in FIG. 4B, transfer plates 41a and 41b respectively having recessed portions 411a and 411b that copy the diffraction gratings 12a and 12b are prepared. Then, as shown in FIG. 4C, composite materials 42a and 42b containing an uncured curable resin to be a material for the diffraction grating are filled in the recessed portions 411a and 411b, respectively. Subsequently, as shown in FIG. 4D, the substrate 11 is disposed between the composite materials 42a and 42b, and the composite material 42a and the composite material 42b are brought into close contact with the one surface 11a and the one surface 11b of the substrate 11, respectively. Further, the resin contained in the composite materials 42a and 42b is cured, and the transfer plates 41a and 41b are separated, thereby forming the diffraction gratings 12a and 12b shown in FIG. 4E. It is appropriate that the composite materials 42a and 42b should be brought into close contact with the one surface 11a and the one surface 11b of the substrate 11 under a reduced pressure. At this time, it is preferable that the composite materials 42a and 42b are pressed against these surfaces while applying a pressure suitably. In this way, the composite materials 42a and 42b can be brought into close contact with the substrate 11 without any gap being formed therebetween. Also, when the composite materials 42a and 42b contain a photocurable resin, it is preferable to fill an application liquid that contains the composite material and is diluted by a solvent in the recessed portions 411a and 411b, followed by drying to vaporize the solvent, and then bring it into close contact with the substrate 11. This is because the difference in refractive index can be prevented. It should be noted that the composite material may contain a cross-linking agent, a polymerization initiator, a dispersing agent, etc. as required.

It is preferable that the surfaces of the transfer plates 41a and 41b are coated with a release agent such as a fluorine-based resin. This is because it becomes easier to release the transfer plates 41a and 41b from the diffraction grating material.

Figure 5A:
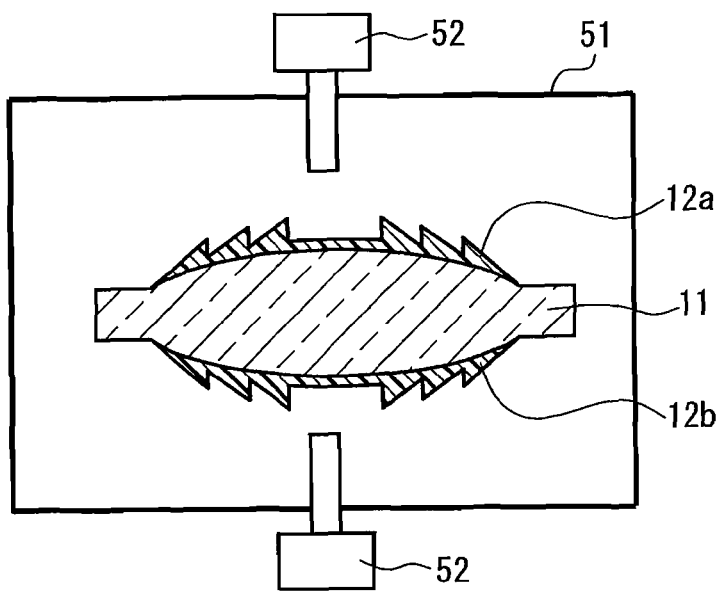
FIGS. 5A to 5C are sectional views respectively showing processes of the method for manufacturing the diffractive optical element according to Embodiment 1 of the present invention.

Next, as shown in FIG. 5A, the substrate 11 provided with the diffraction gratings 12a and 12b is placed inside a decompression container 51, and the pressure in the decompression container 51 is reduced. The pressure inside the decompression container 51 does not have to be reduced to a level required in a vacuum process such as vacuum deposition or chemical vapor deposition (CVD). A sufficient effect can be achieved with a pressure of about 1 Pa to about 5000 Pa, for example, and the pressure equal to or lower than 100 Pa is preferable.

Figure 5B:
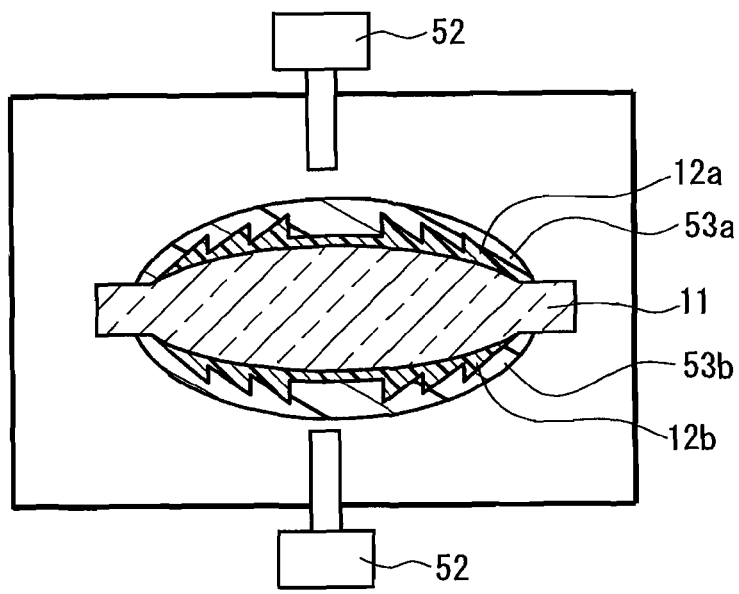

Then, as shown in FIG. 5B, inside the pressure-reduced decompression container 51, application liquids 53a and 53b for forming the composite material are supplied through the vacuum injection nozzles 52 and applied to the diffraction gratings 12a and 12b. At this time, since the pressure is reduced, air bubbles are removed from the application liquids 53a and 53b, and the application liquids 53a and 53b are applied to finely formed portions of the diffraction gratings 12a and 12b without any gap being formed therebetween.

Figure 5C:
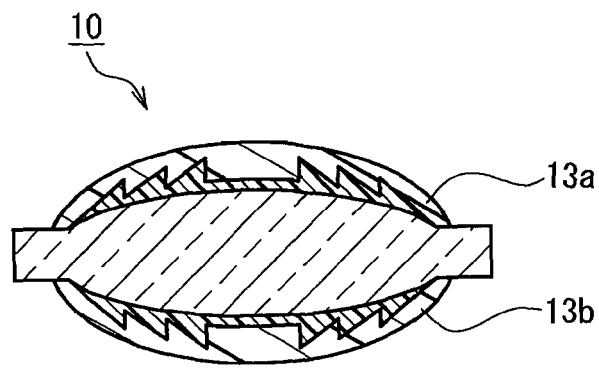

Finally, the solvent is removed under atmospheric pressure, thereby obtaining the protective films 13a and 13b. Thus, as shown in FIG. 5C, the lens 10 in Specific example 1 is completed.

Now, an example other than Specific example 1 described above (hereinafter, referred to as "Specific example 2") will be described.

SPECIFIC EXAMPLE 2

The substrate 11 is formed of an optical glass (a Schott K-LaFn; with a d-line refractive index of 1.685 and an Abbe's number of 49.2). The shape of the substrate is not particularly limited and may be, for example, an aspherical shape or a spherical shape. When the substrate is formed to have a spherical shape, it is no longer necessary to use mold processing using a mold glass, so that a spherical glass can be formed easily by grinding, leading to an improved mass productiveness.

The diffraction gratings 12a and 12b are formed of a composite material (with a d-line refractive index of 1.683, an Abbe's number of 18.9 and a content of zinc oxide in the composite material of 30% by volume) containing zinc oxide and a resin containing polycarbonate as a principal component. The diffraction gratings 12a and 12b have a depth of 5.2 µm.

The above-mentioned "resin containing polycarbonate as a principal component" refers to a resin containing at least 95% by weight, and preferably at least 98% by weight, of polycarbonate. Although polycarbonate is used as the thermoplastic resin, there is no limitation to this as long as it has a predetermined refractive index. For example, polyethylene, polystyrene or the like may be used.

The protective films 13a and 13b are formed of a composite material (with a d-line refractive index of 1.796, an Abbe's number of 41.9 and a content of zirconium oxide in the composite material of 50% by volume) containing zirconium oxide and a resin containing a cycloolefin-based resin as a principal component. These protective films 13a and 13b can be formed by application by spin coating, dip coating or the like, or formed by molding using a mold.

The above-mentioned "resin containing a cycloolefin-based resin as a principal component" refers to a resin containing at least 90% by weight, and preferably at least 95% by weight, of a cycloolefin-based resin. Although a cycloolefin-based resin is used as the thermoplastic resin, there is no limitation to this as long as it has a predetermined refractive index. For example, polyethylene, polystyrene or the like may be used.

Although the refractive indices of the substrate 11, the diffraction gratings 12a and 12b and the protective films 13a and 13b are not particularly limited, it is preferable that the refractive indices of the diffraction gratings 12a and 12b are close to the refractive index of the substrate 11 (for example, −5% to 5% of the refractive index of the substrate). This is because it is possible to reduce reflection loss at an interface between the substrate 11 and the diffraction grating 12a or the diffraction grating 12b. Further, it is preferable that a material forming at least one selected from the diffraction gratings 12a and 12b and the protective films 13a and 13b further contains a substance that absorbs light having a wavelength in an infrared radiation range, similarly to Specific example 1. Also, at least one selected from the protective films 13a and 13b preferably is configured so that a surface thereof opposite to the side of the diffraction grating is in an antireflection form having nano-order asperities, similarly to Specific example 1.

Now, a preferred method for manufacturing the lens of Specific example 2 described above will be described. FIG. 6 is sectional views respectively showing processes of part of the method for manufacturing the lens in Specific example 2.

Figure 6A:
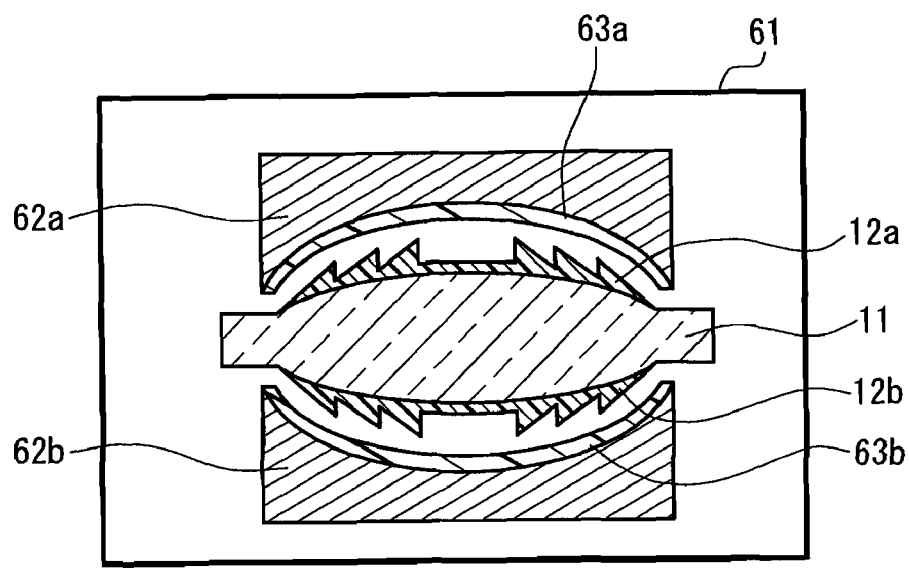
FIGS. 6A to 6C are sectional views respectively showing processes of another method for manufacturing the diffractive optical element according to Embodiment 1 of the present invention.
Figure 6B:
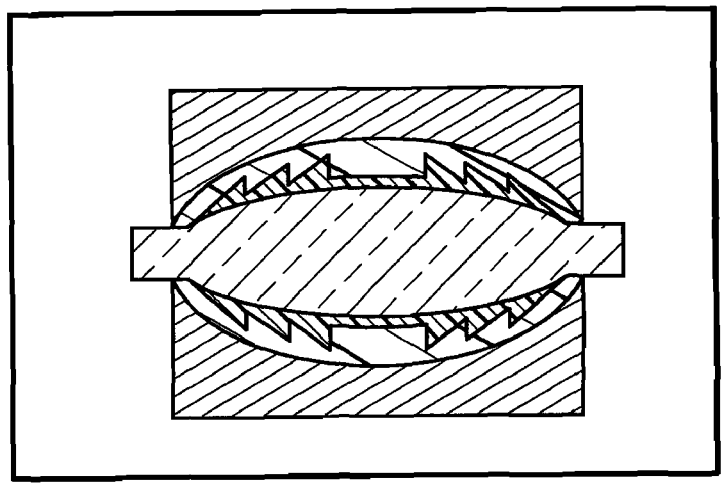
Figure 6C:
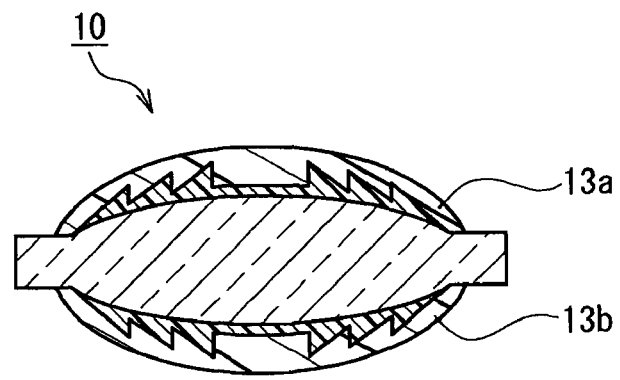

As shown in FIG. 6A, inside a pressure-reduced decompression container 61, composite materials 63a and 63b that contain a thermoplastic resin whose viscosity has been reduced and have been applied to transfer plates 62a and 62b are brought into close contact with surfaces of the diffraction gratings 12a and 12b (see FIG. 6B), followed by cooling so as to solidifying the composite materials 63a and 63b. Next, the transfer plates 62a and 62b are separated, thereby forming the protective films 13a and 13b. Thus, the lens 10 in Specific example 2 shown in FIG. 6C is obtained.

Applying the composite materials 63a and 63b to the transfer plates 62a and 62b by spin coating or the like, for example, is preferable because it becomes possible to adjust the film thickness. A thin film whose thickness is about several tens of micrometers further facilitates the removal of air bubbles from the composite materials 63a and 63b. Besides this method, it may be possible to apply the composite materials 63a and 63b to the surfaces of the diffraction gratings 12a and 12b and then press the transfer plates 62a and 62b against them so as to form the shape of the protective film.

At the time of bringing the composite materials 63a and 63b into close contact with the diffraction gratings 12a and 12b, it is preferable to press the composite materials 63a and 63b against the diffraction gratings 12a and 12b while applying a pressure suitably. In this way, the composite materials 63a and 63b can be brought into close contact with the diffraction gratings 12a and 12b without any gap being formed therebetween. Coating the transfer plates 62a and 62b with a release agent such as a fluorine-based resin facilitates releasing of the transfer plates 62a and 62b from the diffraction grating material.

Although not shown in the figure, the diffraction gratings 12a and 12b also can be formed by a method similar to the method for forming the protective films 13a and 13b described above.

The method for manufacturing the lens 10 in Specific example 2 is not limited to that described above and may be selected suitably according to materials for the resin and the inorganic particles, the application method, etc., for example.

Figure 7:
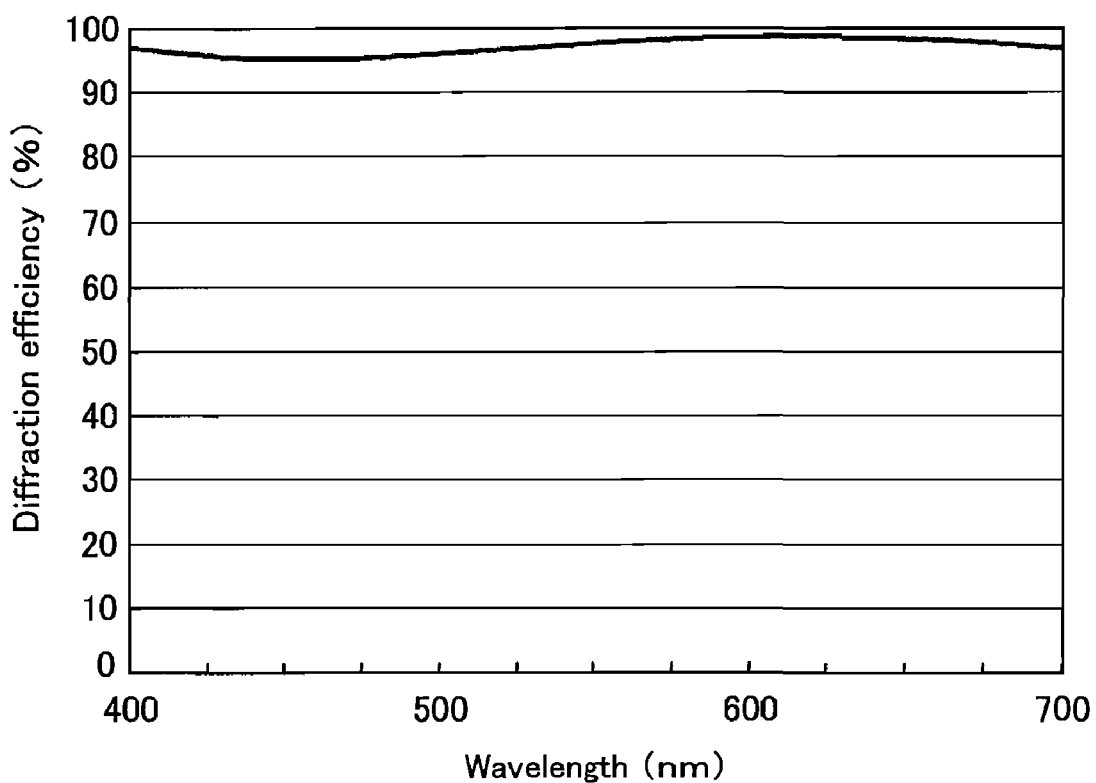
FIG. 7 is a graph showing variation of the first-order diffraction efficiency with wavelength that a diffractive optical element according to another specific example in Embodiment 1 of the present invention exhibited.

FIG. 7 is a graph showing variation of the first-order diffraction efficiency with wavelength in one surface of the lens in Specific example 2. From FIG. 7, it is evident that the diffraction efficiency is equal to or higher than 95% over the entire region of visible light at wavelengths of 400 nm to 700 nm.

It should be noted that the same properties as those shown in FIG. 7 can be achieved when a similar lens is formed by interchanging the material for the diffraction grating and the material for the protective film.

Figure 8:
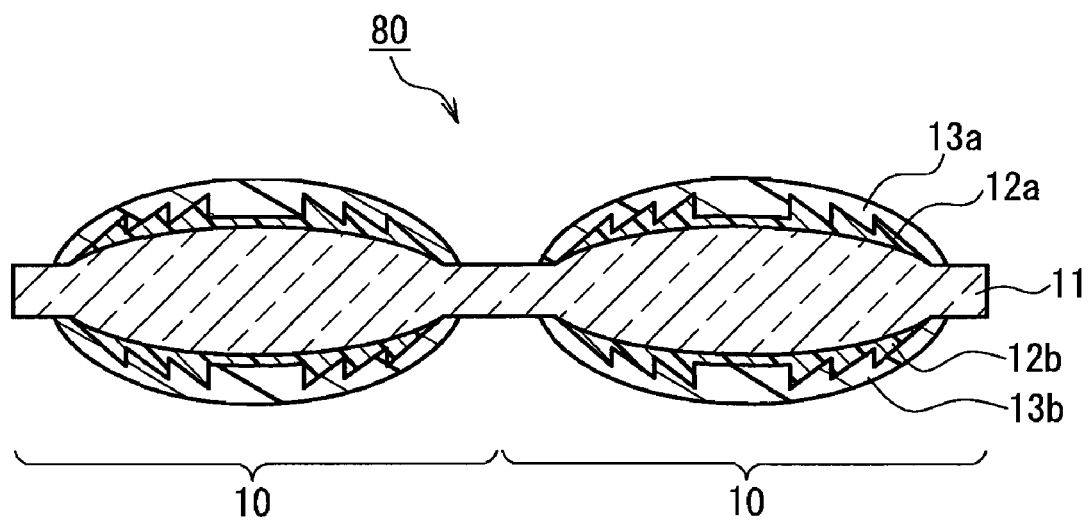
FIG. 8 is a sectional view showing another variation of the diffractive optical element according to Embodiment 1 of the present invention.

Now, a variation of the lens 10 will be described with reference to FIG. 8, which shows a cross-section thereof. As shown in FIG. 8, a lens 80 is a lens array connecting a plurality of the lenses 10. With this configuration, the lens 80 is particularly suitable for uses in distance measurement with a triangulation principle. It should be noted that the lens 80 can be manufactured by a method similar to the method for manufacturing the lens 10 described above.

Embodiment 2

Figure 9:
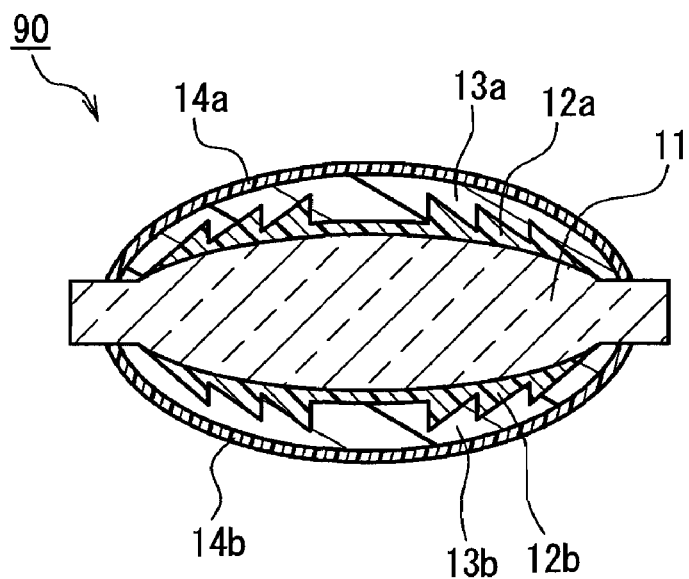
FIG. 9 is a sectional view showing a diffractive optical element according to Embodiment 2 of the present invention.

FIG. 9 is a sectional view showing a lens 90 serving as an example of a diffractive optical element according to the present invention. The lens 90 of the present embodiment includes not only the constituent elements of the lens 10 described above but also an antireflection film 14a that is disposed on a surface of the protective film 13a opposite to the diffraction grating 12a and an antireflection film 14b that is disposed on a surface of the protective film 13b opposite to the diffraction grating 12b. This makes it possible to both produce the effect similar to the lens 10 described above and reduce light to be totally reflected among light that has entered the lens 90, resulting in a higher diffraction efficiency.

The following is a description of a preferred example of a combination of the materials forming individual members of the lens 90 (hereinafter, referred to as "Specific example 3").

SPECIFIC EXAMPLE 3

The substrate 11 is formed of an epoxy resin (with a d-line refractive index of 1.508).

The diffraction gratings 12a and 12b are formed of a composite material (with a d-line refractive index of 1.809, an Abbe's number of 17.6 and a content of tantalum oxide in the composite material of 40% by volume) containing tantalum oxide and a resin containing polycarbonate as a principal component. The diffraction gratings 12a and 12b have a depth of 5.71 μm.

The above-mentioned "resin containing polycarbonate as a principal component" refers to a resin containing at least 95% by weight, and preferably at least 98% by weight, of polycarbonate. Although polycarbonate is used as the thermoplastic resin, there is no limitation to this as long as it has a predetermined refractive index. For example, polyethylene, polystyrene or the like may be used.

The protective films 13a and 13b are formed of a composite material (with a d-line refractive index of 1.912, an Abbe's number of 38.9 and a content of zirconium oxide in the composite material of 70% by volume) containing zirconium oxide and a resin containing a cycloolefin-based resin as a principal component. These protective films 13a and 13b can be formed by application by spin coating, dip coating or the like, or formed by molding using a mold.

The above-mentioned "resin containing a cycloolefin-based resin as a principal component" refers to a resin containing at least 90% by weight, and preferably at least 95% by weight, of a cycloolefin-based resin. Although a cycloolefin-based resin, which is a thermoplastic resin, is used, there is no limitation to this as long as it has a predetermined refractive index. For example, polyethylene, polystyrene or the like may be used.

The antireflection films 14a and 14b are formed of a composite material obtained by dispersing and mixing silicon oxide in CYTOP (trade name; produced by Asahi Glass Co., Ltd.), which is an amorphous perfluororesin, so that the volume ratio of silicon oxide is 38%. Here, the composite material has a d-line refractive index of 1.383, which is substantially equal to a square root of the refractive index of 1.912 of the protective films 13a and 13b. The antireflection films 14a and 14b have a thickness of 0.11 μm. The coating of the antireflection films 14a and 14b can be performed easily by application by spin coating, dip coating or the like. Incidentally, although the antireflection films 14a and 14b may be formed of the resin alone, they more preferably are formed of the above-described composite material. Silicon oxide has an excellent light transmitting property as inorganic particles and is characterized by a low refractive index and a high Abbe's number as an inorganic material (the d-line refractive index is 1.456, and the Abbe's number is 68.4). Therefore, an antireflection effect can be achieved over a wide wavelength band.

Although the antireflection films 14a and 14b may be formed by layering single-layer films or multi-layer films of an inorganic material by vacuum deposition or the like, they preferably are formed using the above-described composite material because the manufacturing becomes easier. Also, when a similar composite material is used for the protective film, the difference in coefficient of thermal expansion between the protective film and the antireflection film can be reduced, thus making it possible to obtain stable properties with respect to the ambient temperature and achieve an effect that cracking or film peeling does not occur easily. It should be noted that the other members (the substrate, the diffraction grating and the protective film) of the lens 90 can be formed by a method similar to the method for manufacturing the lens 10 described above.

Figure 10:
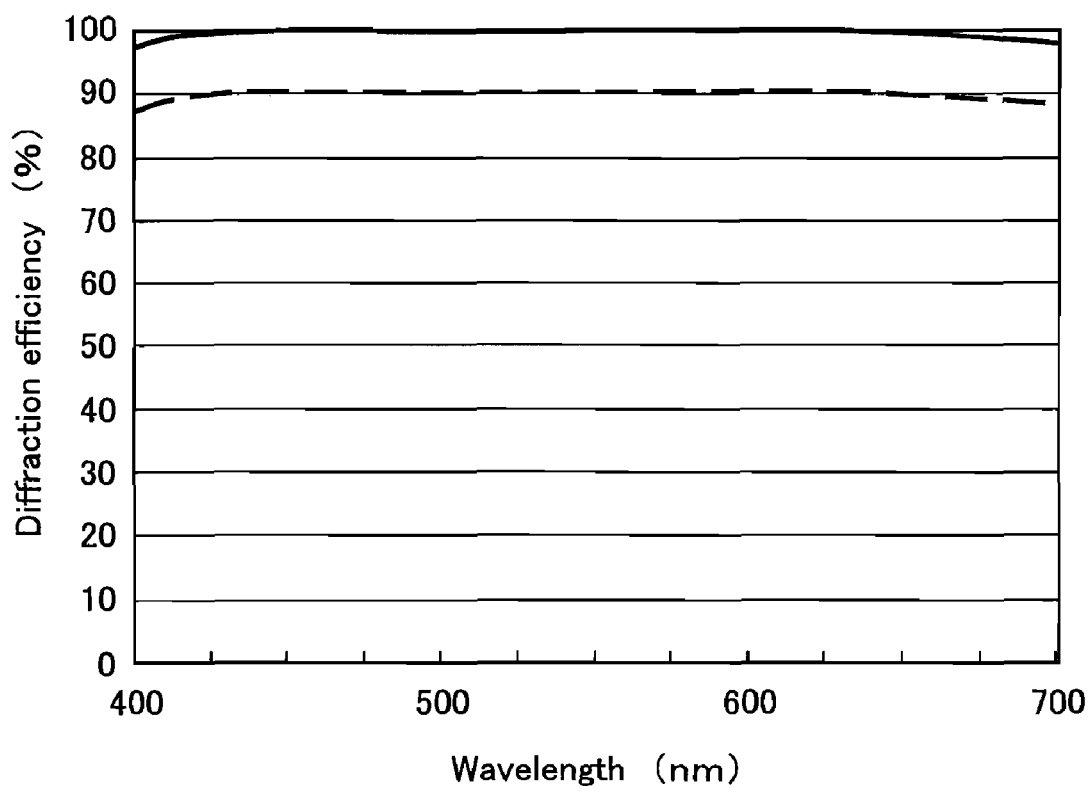
FIG. 10 is a graph showing variation of the first-order diffraction efficiency with wavelength that a diffractive optical element according to a specific example in Embodiment 2 of the present invention exhibited.

In FIG. 10, a solid line indicates the wavelength dependence of the first-order diffraction efficiency in one surface of the lens 90. Also, in FIG. 10, a broken line indicates the wavelength dependence of the first-order diffraction efficiency in one surface of a lens obtained by removing the antireflection films 14a and 14b from the lens 90.

It is found from FIG. 10 that the lens 90 (indicated by the solid line) has an improved diffraction efficiency compared with the lens without the antireflection films 14a and 14b (indicated by the broken line). This is considered to be because the reflection loss can be reduced by the antireflection films 14a and 14b.

In the following, the present invention will be described more specifically by way of examples. It should be noted that the present invention is not limited to the following examples.

EXAMPLE 1

First, a diffractive optical element No. 2 shown in Table 1 was prepared. An optical glass (with a maximum thickness of 900 μm) whose both surfaces are convex and aspherical was used as the substrate. Compared with a usual resin material, a glass material has less variation in refractive index caused by temperature variation and is excellent in light resistance. Accordingly, a lens configuration in which the substrate is formed of the glass material is effective for uses as an objective lens in an optical pickup for Blu-ray disks. As the composite material forming the diffraction grating, a mixture material of a cycloolefin-based resin ("ZEONEX", produced by Zeon Corporation) and zirconium oxide (with a d-line refractive index of 2.10 and an Abbe's number of 35.5) was used. Zirconium oxide, which is a material with a high refractive index and a low dispersion, is mixed, whereby it is possible to achieve a composite resin with a high refractive index and a low dispersion (see Formula 4 above). Further, a mixture material of a cycloolefin-based resin ("ZEONEX", produced by Zeon Corporation) and zinc oxide was used as the composite material forming the protective film.

The first-order diffraction efficiencies of this diffractive optical element were measured by a recording spectrophotometer (manufactured by Hitachi, Ltd., U3410 model) at wavelengths of 400 nm, 500 nm, 600 nm, and 700 nm.

Also, other diffractive optical elements in Example 1 (Nos. 1 and 3 to 20) and Reference examples (Nos. 21 to 31) were prepared while varying the combination of the inorganic particles and the resin, the content of the inorganic particles and the diffraction grating depth, and the first-order diffraction efficiencies thereof were measured by the same measurement method. Table 1 shows the combination of the inorganic particles and the resin, the thickness and light transmittance of the diffraction grating, the content (by volume) of the inorganic particles, the diffraction grating depth and the first-order diffraction efficiency in each sample. It is noted that PC in Table 1 refers to a polycarbonate resin (lupilon, produced by Mitsubishi Engineering-Plastics Corporation). The diffraction grating depth in Table 1 is a value obtained by calculation using Formula 2 described above. Further, the light transmittance in Table 1 is a transmittance of light at a wavelength of 400 nm and was measured using a recording spectrophotometer (manufactured by Hitachi, Ltd., U3410 model).

TABLE 1

| No. | Diffraction grating ||||| Protective film ||| Diffraction grating depth (μm) | First-order diffraction efficiency (%) ||||
|---|---|---|---|---|---|---|---|---|---|---|---|---|---|
| | Resin | Inorganic particles | Content (%) | Thickness (μm) | Light transmittance (%) | Resin | Inorganic Particles | Content (%) | | 400 nm | 500 nm | 600 nm | 700 nm |
| 1 | ZEONEX | ZrO$_2$ | 30 | 20 | 94.3 | PC | — | — | 5.88 | 88.4 | 98.5 | 95.0 | 84.5 |
| 2 | ZEONEX | ZrO$_2$ | 30 | 20 | 94.3 | ZEONEX | ZnO | 30 | 12.78 | 82.3 | 98.7 | 98.7 | 97.7 |
| 3 | ZEONEX | ZrO$_2$ | 30 | 20 | 94.3 | PC | ZnO | 10 | 8.65 | 98.6 | 98.0 | 98.6 | 95.0 |
| 4 | ZEONEX | ZrO$_2$ | 30 | 20 | 94.3 | PC | Ta$_2$O$_5$ | 10 | 13.07 | 85.6 | 98.0 | 97.6 | 98.7 |

TABLE 1-continued

| | Diffraction grating | | | | | Protective film | | | Diffraction grating depth (μm) | First-order diffraction efficiency (%) | | | |
|---|---|---|---|---|---|---|---|---|---|---|---|---|---|
| No. | Resin | Inorganic particles | Content (%) | Thickness (μm) | Light transmittance (%) | Resin | Inorganic Particles | Content (%) | | 400 nm | 500 nm | 600 nm | 700 nm |
| 5 | PC | ZrO$_2$ | 30 | 20 | 95.9 | PC | ZnO | 20 | 7.26 | 80.6 | 92.6 | 98.7 | 95.7 |
| 6 | PC | ZrO$_2$ | 30 | 20 | 95.9 | PC | ZnO | 30 | 12.51 | 83.9 | 98.7 | 98.6 | 98.4 |
| 7 | ZEONEX | ZrO$_2$ | 40 | 20 | 92.5 | ZEONEX | ZnO | 30 | 5.82 | 95.6 | 98.7 | 95.8 | 87.1 |
| 8 | ZEONEX | ZrO$_2$ | 40 | 20 | 92.5 | ZEONEX | ZnO | 40 | 9.48 | 84.6 | 98.7 | 98.7 | 98.0 |
| 9 | ZEONEX | ZrO$_2$ | 40 | 20 | 92.5 | PC | ZnO | 10 | 4.78 | 93.2 | 98.7 | 94.1 | 83.5 |
| 10 | ZEONEX | ZrO$_2$ | 40 | 20 | 92.5 | PC | ZnO | 20 | 6.53 | 98.7 | 98.2 | 98.4 | 94.6 |
| 11 | ZEONEX | ZrO$_2$ | 40 | 20 | 92.5 | PC | Ta$_2$O$_5$ | 10 | 5.88 | 96.4 | 98.7 | 95.2 | 86.2 |
| 12 | PC | ZrO$_2$ | 40 | 20 | 94.6 | PC | ZnO | 30 | 6.06 | 87.3 | 91.6 | 98.1 | 97.5 |
| 13 | PC | ZrO$_2$ | 40 | 20 | 94.6 | PC | ZnO | 40 | 9.19 | 88.8 | 98.2 | 98.2 | 98.6 |
| 14 | PC | ZrO$_2$ | 40 | 20 | 94.6 | PC | TiO$_2$ | 20 | 10.5 | 85.0 | 98.7 | 98.7 | 98.1 |
| 15 | ZEONEX | ZrO$_2$ | 50 | 20 | 90.7 | PC | ZnO | 30 | 5.2 | 97.0 | 96.1 | 98.7 | 96.9 |
| 16 | ZEONEX | ZrO$_2$ | 50 | 20 | 90.7 | PC | ZnO | 40 | 7.26 | 82.7 | 98.7 | 98.5 | 98.5 |
| 17 | ZEONEX | ZrO$_2$ | 50 | 20 | 90.7 | PC | TiO$_2$ | 20 | 8.17 | 81.0 | 98.5 | 98.1 | 98.7 |
| 18 | ZEONEX | ZrO$_2$ | 50 | 20 | 90.7 | PC | Ta$_2$O$_5$ | 20 | 5.82 | 98.5 | 98.7 | 95.9 | 88.3 |
| 19 | PC | ZrO$_2$ | 50 | 20 | 93.3 | PC | ZnO | 50 | 7.26 | 89.5 | 98.4 | 98.5 | 98.3 |
| 20 | PC | ZrO$_2$ | 50 | 20 | 93.3 | PC | TiO$_2$ | 25 | 8.17 | 90.5 | 98.1 | 98.2 | 98.6 |
| 21 | ZEONEX | ZrO$_2$ | 60 | 20 | 88.9 | PC | ZnO | 40 | 4.26 | 96.5 | 96.9 | 98.7 | 95.4 |
| 22 | ZEONEX | ZrO$_2$ | 60 | 20 | 88.9 | PC | ZnO | 50 | 5.65 | 85.2 | 98.0 | 97.5 | 94.1 |
| 23 | ZEONEX | ZrO$_2$ | 60 | 20 | 88.9 | PC | Ta$_2$O$_5$ | 30 | 5.82 | 96.6 | 98.3 | 96.1 | 89.9 |
| 24 | ZEONEX | ZrO$_2$ | 70 | 20 | 87.2 | PC | Ta$_2$O$_5$ | 40 | 5.71 | 88.8 | 98.0 | 97.1 | 93.0 |
| 25 | ZEONEX | ZrO$_2$ | 80 | 20 | 85.5 | PC | Ta$_2$O$_5$ | 40 | 3.61 | 98.7 | 98.3 | 93.9 | 85.1 |
| 26 | PC | ZrO$_2$ | 85 | 20 | 88.9 | ZEONEX | TiO$_2$ | 50 | 5.3 | 82.3 | 98.7 | 98.7 | 97.9 |
| 27 | ZEONEX | ZrO$_2$ | 50 | 30 | 86.4 | PC | ZnO | 27 | 4.70 | 93.0 | 97.3 | 99.9 | 95.9 |
| 28 | ZEONEX | ZrO$_2$ | 50 | 40 | 82.2 | PC | ZnO | 35 | 5.96 | 99.3 | 99.5 | 100.0 | 97.7 |
| 29 | ZEONEX | ZrO$_2$ | 50 | 50 | 78.3 | PC | TiO$_2$ | 15 | 5.37 | 95.5 | 97.7 | 100.0 | 96.2 |
| 30 | ZEONEX | ZrO$_2$ | 30 | 900 | 7.1 | ZEONEX | ZnO | 28 | 10.72 | 99.0 | 99.5 | 100.0 | 97.7 |
| 31 | ZEONEX | ZrO$_2$ | 50 | 900 | 1.2 | PC | ZnO | 35 | 5.96 | 99.3 | 99.5 | 100.0 | 97.7 |

From Table 1, Nos. 1 to 31 had a first-order diffraction efficiency higher than 80% in any of the cases of 400 nm, 500 nm, 600 nm and 700 nm. Although not shown in Table 1, the first-order diffraction efficiency was higher than 80% over the entire wavelength band from 400 nm to 700 nm. Further, in all of the combinations, the diffraction grating depth was not greater than 15 μm, which facilitated manufacturing. Also, Nos. 1 to 20 in which the volume ratio of the inorganic particles with respect to the composite material was equal to or smaller than 50% by volume and the diffraction grating had a thickness of equal to or smaller than 20 μm achieved a light transmittance of at least 90%, whereas Nos. 21 to 31 that did not satisfy the above conditions had a light transmittance of less than 90%.

By using the composite material containing zirconium oxide as the material for the diffraction grating in this manner, it is possible to reduce the wavelength dependence of the diffraction efficiency.

EXAMPLE 2

As Example 2, diffractive optical elements shown in Table 2 were prepared. Conditions other than the conditions shown in Table 2 were similar to those in Example 1 described above.

TABLE 2

| | Diffraction grating | | | | | Protective film | | | Diffraction grating depth (μm) | First-order diffraction efficiency (%) | | | |
|---|---|---|---|---|---|---|---|---|---|---|---|---|---|
| No. | Resin | Inorganic Particles | Content (%) | Thickness (μm) | Light Transmittance (%) | Resin | Inorganic particles | Content (%) | | 400 nm | 500 nm | 600 nm | 700 nm |
| 1 | PC | ZnO | 10 | 20 | 99.2 | PC | Al$_2$O$_3$ | 40 | 14.7 | 90.6 | 98.6 | 98.7 | 97.9 |
| 2 | PC | ZnO | 10 | 20 | 99.2 | PC | Al$_2$O$_3$ | 50 | 10.14 | 98.5 | 95.5 | 98.1 | 98.2 |
| 3 | PC | ZnO | 20 | 20 | 98.5 | PC | Y$_2$O$_3$ | 50 | 5.71 | 88.6 | 98.0 | 96.7 | 87.9 |
| 4 | PC | ZnO | 20 | 20 | 98.5 | PC | Y$_2$O$_3$ | 40 | 8.52 | 91.4 | 95.9 | 98.7 | 94.7 |
| 5 | PC | ZnO | 30 | 20 | 97.7 | PC | Y$_2$O$_3$ | 50 | 8.4 | 98.6 | 97.6 | 98.7 | 97.1 |
| 6 | ZEONEX | ZnO | 40 | 20 | 95.4 | ZEONEX | Y$_2$O$_3$ | 55 | 9.48 | 90.6 | 98.6 | 98.7 | 97.7 |
| 7 | ZEONEX | ZnO | 40 | 20 | 95.4 | PC | Y$_2$O$_3$ | 40 | 14.34 | 94.1 | 97.8 | 98.3 | 98.4 |

Seven combinations listed here achieved a first-order diffraction efficiency of higher than 80% over the entire wavelength band from 400 nm to 700 nm. Further, in all of the combinations, the diffraction grating depth was not greater than 15 µm, which facilitated manufacturing. By using the composite material containing zinc oxide as the material for the diffraction grating in this manner, it is possible to reduce the wavelength dependence of the diffraction efficiency.

EXAMPLE 3

As Example 3, a diffractive optical element shown in Table 3 was prepared. Conditions other than the conditions shown in Table 3 were similar to those in Example 1 described above.

TABLE 3

| | Diffraction grating | | | | | Protective film | | | Diffraction grating depth (µm) | First-order diffraction efficiency (%) | | | |
|---|---|---|---|---|---|---|---|---|---|---|---|---|---|
| | | | | Thickness | Light | | | | | | | | |
| No. | Resin | Inorganic Particles | Content (%) | (µm) | Transmittance (%) | Resin | Inorganic particles | Content (%) | | 400 nm | 500 nm | 600 nm | 700 nm |
| 1 | ZEONEX | Al$_2$O$_3$ | 50 | 20 | 95.8 | PC | — | — | 9.97 | 96.4 | 98.7 | 98.1 | 94.3 |

The combination listed here achieved a first-order diffraction efficiency of higher than 90% over the entire wavelength band from 400 nm to 700 nm. Further, the diffraction grating depth was not greater than 10 µm, which facilitated manufacturing. By using the composite material containing aluminum oxide as the material for the diffraction grating and the resin formed of polycarbonate alone as the material for the protective film in this manner, it is possible to reduce the wavelength dependence of the diffraction efficiency.

EXAMPLE 4

As Example 4, a diffractive optical element shown in Table 4 was prepared. Conditions other than the conditions shown in Table 4 were similar to those in Example 1 described above.

TABLE 4

| | Diffraction grating | | | | | Protective film | | | Diffraction grating depth (µm) | First-order diffraction efficiency (%) | | | |
|---|---|---|---|---|---|---|---|---|---|---|---|---|---|
| | | | | Thickness | Light | | | | | | | | |
| No. | Resin | Inorganic Particles | Content (%) | (µm) | Transmittance (%) | Resin | Inorganic particles | Content (%) | | 400 nm | 500 nm | 600 nm | 700 nm |
| 1 | ZEONEX | TiO$_2$ | 20 | 20 | 92.0 | ZEONEX | Y$_2$O$_3$/ZrO$_2$ | 22.5/20 | 12.26 | 97.0 | 97.2 | 98.2 | 98.4 |

The combination listed here achieved a first-order diffraction efficiency of higher than 95% over the entire wavelength band from 400 nm to 700 nm. Further, the diffraction grating depth was not greater than 15 µm, which facilitated manufacturing. By using the composite material containing plural kinds of the inorganic particles as the material for the protective film in this manner, it is possible to reduce the wavelength dependence of the diffraction efficiency and decrease the diffraction grating depth.

EXAMPLE 5

As Example 5, a diffractive optical element shown in Table 5 was prepared. Conditions other than the conditions shown in Table 5 were similar to those in Example 1 described above.

When a material containing no inorganic particle is used as the material for the protective film as in Example 5, a process of preparing the material for the protective film is not needed. Thus, the number of processes can be reduced compared with the case of using the composite materials for both of the material for the protective film and the material for the diffraction grating. Also, as the material for the substrate in Example 5, a cycloolefin-based resin ("ZEONEX", produced by Zeon Corporation) was used. By dividing the blaze portion and using ZEONEX for the substrate portion, which accounts for a major portion of the lens as in the present configuration, it is possible to improve the aberration performance, etc. and achieve at least 80% diffraction efficiency over the entire visible region. Furthermore, since less correction of chromatic aberration is needed in this case, the pitch of the grating rings can be increased, leading to an improved processing accuracy.

TABLE 5

| | | Diffraction grating | | | | | | Protective film | | | Diffraction grating depth (µm) | First-order diffraction efficiency (%) | | | |
|---|---|---|---|---|---|---|---|---|---|---|---|---|---|---|---|
| | | | | | Thickness | Light | | | | | | | | | | |
| No. | Substrate material | Resin | Inorganic Particles | Content (%) | (µm) | Transmittance (%) | Resin | Inorganic particles | Content (%) | | 400 nm | 500 nm | 600 nm | 700 nm |
| 1 | ZEONEX | Acrylic | ZrO$_2$ | 20 | 20 | 96.1 | Epoxy-base | — | — | 15.00 | 96.5 | 97.9 | 100.0 | 96.3 |

EXAMPLE 6

As Example 6, five diffractive optical elements that were different only in the volume ratio of the inorganic particles with respect to the composite material forming the diffraction grating were prepared. An optical glass (with a maximum thickness of 900 μm) whose both surfaces were convex and aspherical was used as the substrate. As the composite material forming the diffraction grating, a mixture material of an acrylic resin (TV-7000B, produced by The Nippon Synthetic Chemical Industry, Co., Ltd.) and zirconium oxide (with an average particle diameter of 10 nm, a d-line refractive index of 2.10 and an Abbe's number of 35.5) was used. In the five diffractive optical elements in Example 6, the volume ratio of zirconium oxide with respect to the composite material described above was set to 5%, 10%, 30% and 50% by volume and 70% by volume (Reference example), respectively. Further, as the composite material forming the protective film, a mixture material of a cycloolefin-based resin ("ZEONEX", produced by Zeon Corporation) and zinc oxide was used. The diffraction grating depth was 20 μm for all of them.

The light transmittances of these diffractive optical elements were measured by a recording spectrophotometer (manufactured by Hitachi, Ltd., U3410 model). The results are shown in FIG. 11.

Figure 11:
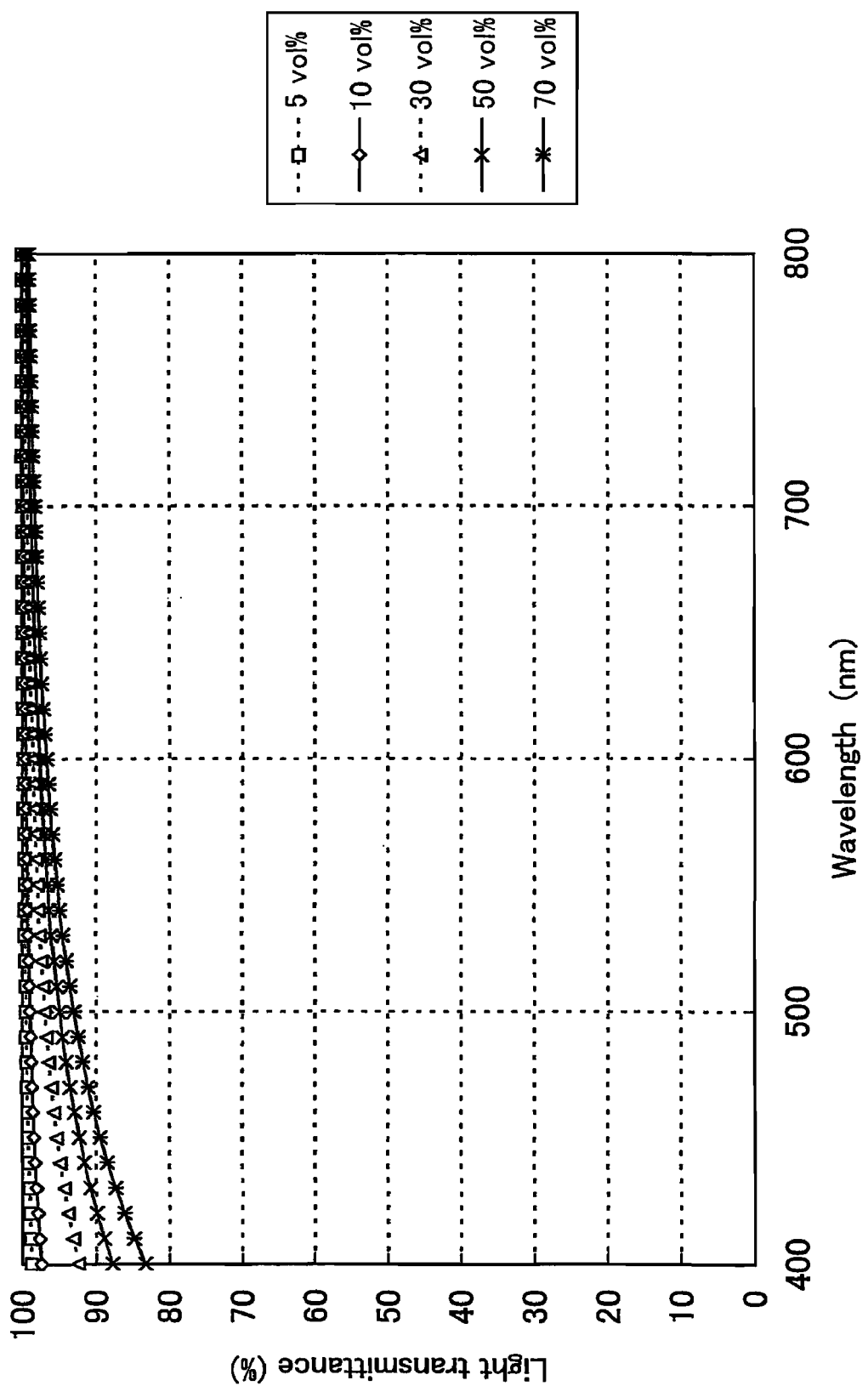
FIG. 11 is a graph showing the light transmittance of diffractive optical elements in Example of the present invention.
Figure 12:
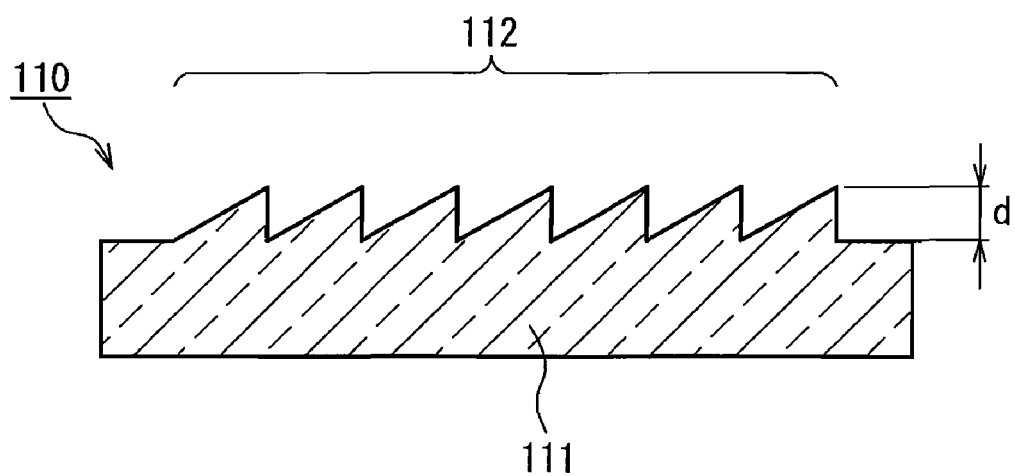
FIG. 12 is a sectional view showing an example of a conventional diffractive optical element.
Figure 13:
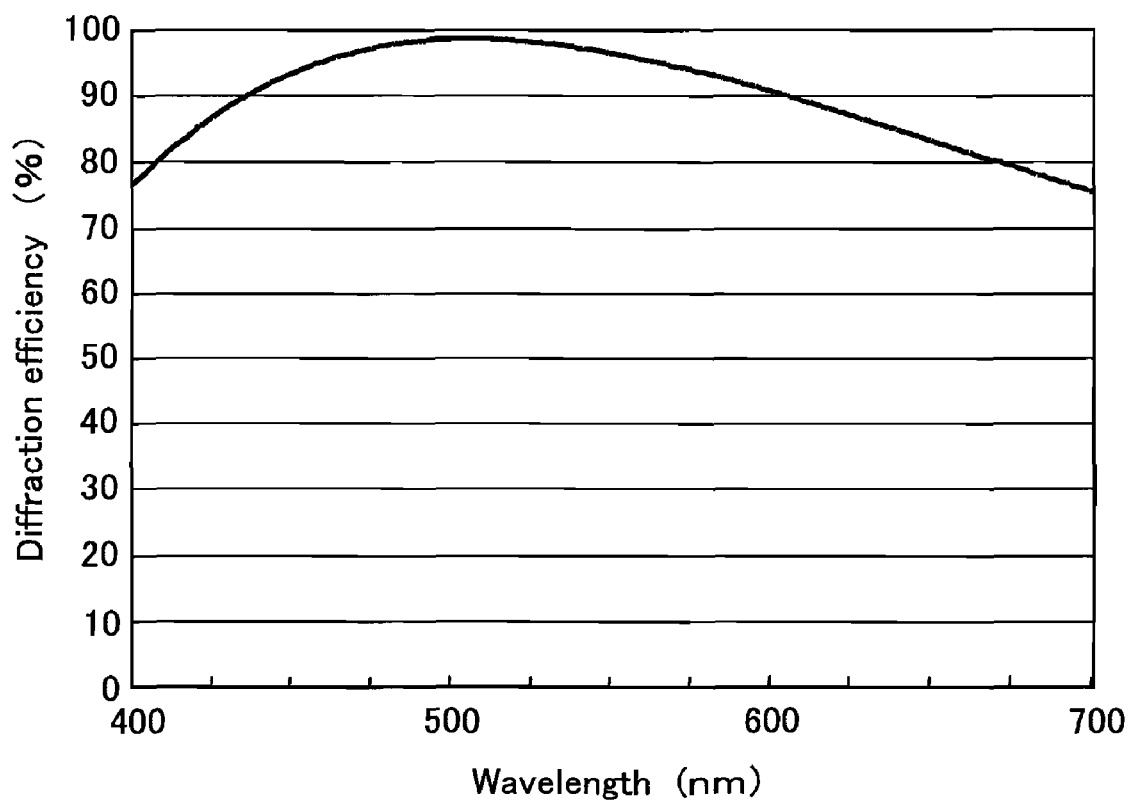
FIG. 13 is a graph showing variation of the first-order diffraction efficiency with wavelength that the diffractive optical element shown in FIG. 12 exhibited.
Figure 14:
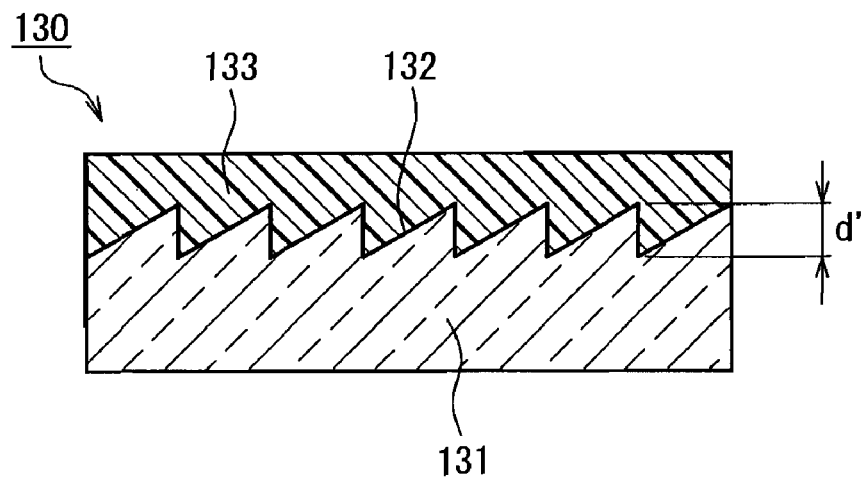
FIG. 14 is a sectional view showing another example of the conventional diffractive optical element.
Figure 15:
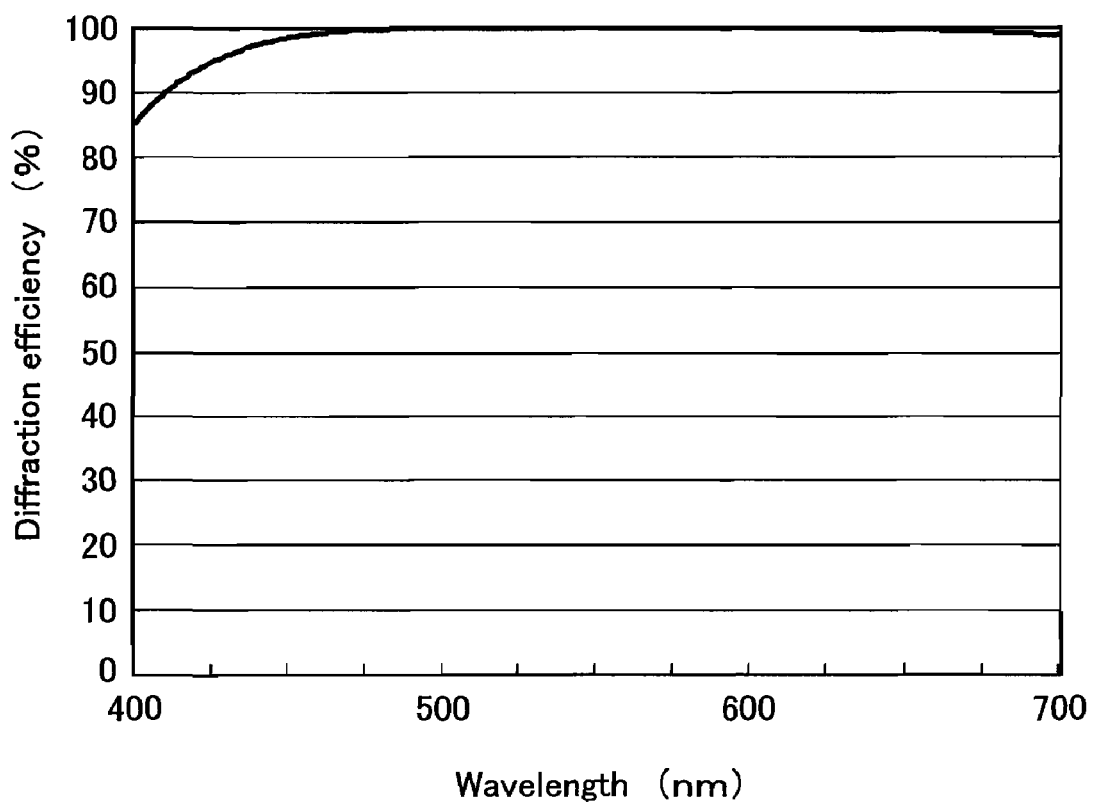
FIG. 15 is a graph showing variation of the first-order diffraction efficiency with wavelength that the diffractive optical element shown in FIG. 14 exhibited.

As shown in FIG. 11, as the volume ratio of zirconium oxide with respect to the composite material decreased, the light transmittance increased. In particular, when the volume ratio of zirconium oxide was equal to or smaller than 50% by volume, a high light transmittance was exhibited over the entire visible region.

Industrial Applicability

In accordance with the present invention, it is possible to provide a diffractive optical element that can maintain transparency and has a small wavelength dependence in a wide wavelength band, for example, over the entire visible region. Also, since the manufacturing is easy, it is possible to provide a diffractive optical element that is preferred especially in an optical system used for imaging such as a camera.

The invention claimed is:

1. A diffractive optical element comprising:
   a substrate;
   a protective film; and
   a diffraction grating disposed between the substrate and the protective film;
   wherein the diffraction grating is formed of a first composite material comprising a first resin and first inorganic particles,
   a volume ratio of the first inorganic particles with respect to the first composite material is 5% to 50% by volume,
   the diffraction grating has a thickness of equal to or smaller than 20 μm,
   the protective film is formed of a material comprising a second resin,
   one of the diffraction grating and the protective film is formed of a material having a high refractive index and a low dispersion and the other is formed of a material having a low refractive index and a high dispersion,
   a first-order diffraction efficiency in a wavelength band of 400 to 700 nm is equal to or higher than 80%, and
   a light transmittance at a wavelength of 400 nm is equal to or higher than 90%.

2. The diffractive optical element according to claim 1, wherein the protective film is formed of a second composite material comprising the second resin and second inorganic particles.

3. The diffractive optical element according to claim 1, wherein the first inorganic particles comprise at least one selected from the group consisting of zirconium oxide, zinc oxide and aluminum oxide.

4. The diffractive optical element according to claim 1, wherein the substrate comprises a resin.

5. The diffractive optical element according to claim 1, wherein the substrate comprises an optical glass.

6. The diffractive optical element according to claim 1, wherein the first composite material is an infrared radiation-blocking material.

7. The diffractive optical element according to claim 1, further comprising an antireflection film that is disposed on a surface of the protective film opposite to the diffraction grating.

8. The diffractive optical element according to claim 7, wherein the antireflection film has a lower refractive index than the protective film.

9. The diffractive optical element according to claim 7, wherein the antireflection film is formed of a third composite material comprising a third resin and third inorganic particles.

10. The diffractive optical element according to claim 9, wherein the third inorganic particles of the antireflection film comprise silicon oxide.

11. The diffractive optical element according to claim 1, wherein the volume ratio of the first inorganic particles with respect to the first composite material is 10% to 40% by volume.

* * * * *